US012578191B1

(12) United States Patent
Chimmili et al.

(10) Patent No.: US 12,578,191 B1
(45) Date of Patent: Mar. 17, 2026

(54) PASSIVE SENSING MECHANISM

(71) Applicant: Amazon Technologies, Inc., Seattle, WA (US)

(72) Inventors: Priyanka Chowdary Chimmili, Milpitas, CA (US); Mohammad Rashidul Quddes, Fremont, CA (US); Morris Yuanhsiang Hsu, Mountain View, CA (US); Peruvemba Ranganath Sai Ananthanarayanan, Fremont, CA (US); Naman B Barmecha, Newark, CA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 18/541,807

(22) Filed: Dec. 15, 2023

(51) Int. Cl.
G01C 9/02 (2006.01)
(52) U.S. Cl.
CPC ............ G01C 9/02 (2013.01); E05Y 2400/44 (2013.01); E05Y 2900/106 (2013.01)
(58) Field of Classification Search
CPC .. G01C 9/02; E05Y 2400/44; E05Y 2900/106
See application file for complete search history.

(56) References Cited

U.S. PATENT DOCUMENTS 7,374,106 B1 * 5/2008 Bromer .............. G06K 19/0723
340/5.32

OTHER PUBLICATIONS

"Inductive and Backscatter Coupling," RFID 4u, https.//rfid4u.com/inductive-and-backscatter-coupling/#:~:text=By, visited Sep. 13, 2023 in 4 pages.
Wang, "Acoustic Backscatter Communication and Power Transfer for Batteryless Wireless Sensors—PMC," Apr. 23, 2023, https://www.ncbi.nlm.nih.gov/pmc/articles/PMC10147092/, visited Sep. 14, 2023 in 23 pages.

* cited by examiner

*Primary Examiner* — Timothy A Brainard
(74) *Attorney, Agent, or Firm* — Knobbe Martens Olson & Bear LLP

(57) ABSTRACT

Systems and methods are provided for determining the tilt-state of a moveable surface using a batteryless mechanism. A tilt-sensing device may be coupled to a moveable surface, such that the tilt-sensing device changes orientation in a manner corresponding the orientation of the moveable surface. The tilt-sensing device may include an antenna and a moveable component. The moveable component may change locations as the tilt-sensing device changes orientation due to gravitational forces. When the tilt-sensing device is in a substantially horizontal orientation, the moveable component may cause a distribution of material on the antenna. The distribution of material may detune the antenna by applying a load. Signals transmitted by the antenna may be shifted with respect to an expected frequency range. An external computing device may determine the tilt-state of the tilt-sensing device based on the presence or absence of a shift within received signals from the tilt-sensing device.

26 Claims, 22 Drawing Sheets

700

702 — START STATE SENSING

703 — RECEIVE STATE INITIALIZATION INFORMATION

704 — RECEIVE SIGNAL(S) OF ONE OR MORE TILT-SENSING DEVICES THROUGH AN ANTENNA

706 — PROCESS THE SIGNAL(S) TO DETERMINE WHETHER STATE EVENT(S) HAS OCCURRED , INCLUDING ADJUSTING THE SIGNAL BASED ON AMBIENT TEMPERATURE

708 — RECORD EVENT(S)

710 — TRANSMIT NOTIFICATION(S) IN RESPONSE TO EVENT(S)

PASSIVE SENSING MECHANISM

BACKGROUND

Generally described, sensor systems may be incorporated into a variety of applications and systems. In some applications, sensor systems may be used to provide information relating to the state of components. For example, sensor systems may be configured to determine whether doors are in open or closed state. A common approach to provide such sensor system information utilizes active, powered sensors which increase the complexity and power consumption of the system.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1A:
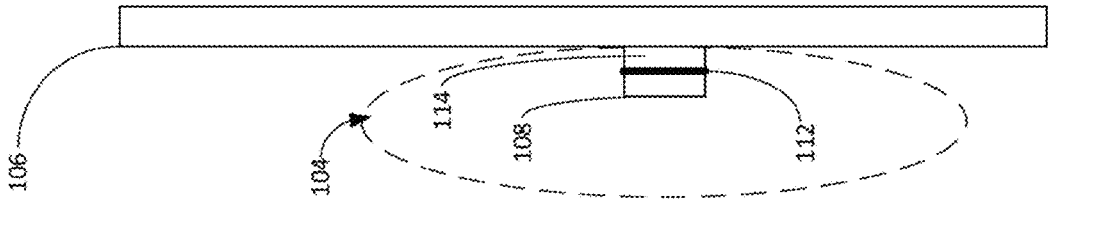
FIGS. 1A-1I illustrate example systems configured to detect the tilt-state of one or more moveable surfaces.
Figure 1A:
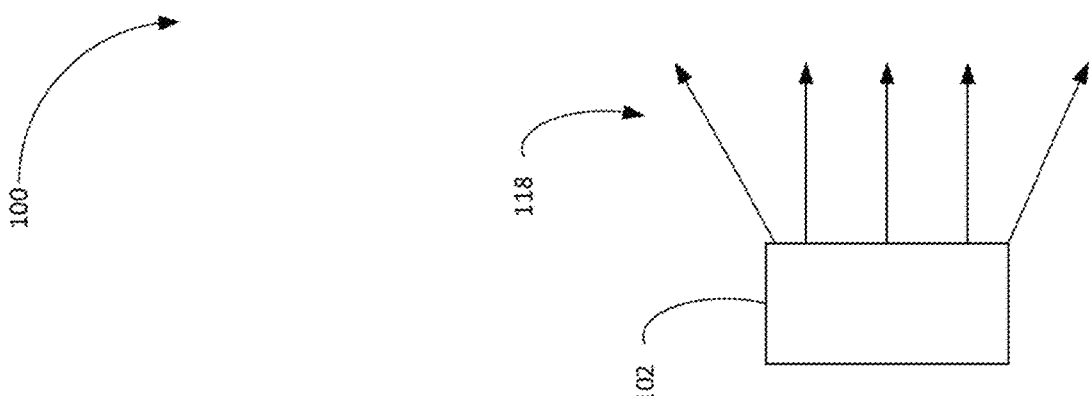

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to a passive sensor system for determining states of components. Specifically, one or more aspects of the present application correspond to a passive tilt-sensing device for determining the tilt-state of a moveable surface. Illustratively, one or more passive, powerless tilt-sensing devices may be disposed on a movable surface that is capable of different orientations corresponding to a defined state. For example, the movable surface can correspond to a garage door that corresponds to a substantially vertical orientation in a "closed" state and a substantially horizontal orientation in an "open" state. As described in greater detail below, the passive tilt-sensing device incorporates an antenna and associated circuitry designed to receive wireless energy and generate responsive signals, illustratively passive circuitry that utilizes the received wireless energy to generate the responsive wireless energy signals.

Additionally, the passive tilt-sensing device further incorporates a detuning mechanism that modifies the frequency of a component ("component frequency") of the tilt-sensing device. In general detuning refers to a shift in frequency attributes conveyed by the antenna of a device in response to the application of a load on the antenna. The detuning mechanism described herein can incorporate a movable portion that causes physical effect that applies a load on the antenna of a tilt-sensing device. This application of the load to the antenna may then alter a component frequency conveyed as a frequency attribute in the responsive wireless energy signal when the tilt-sensing device is oriented illustratively in a substantially horizontal orientation. Accordingly, a device that transmits and receives signals with the passive tilt-sensing device can correlate frequency characteristics of received signals with different states of the surfaces/components (e.g., an open state or a closed state of a movable door). Different states of the surfaces or components may be referred to herein as a tilt-states of the respective surface or component.

In some aspects, the component frequency may be a frequency of a local oscillator (LO) coupled to an antenna of the tilt-sensing device. Illustratively, the tilt-sensing device may include an antenna coupled to a local oscillator (LO), where the LO may be used with a mixer to modify the frequency of a signal. For example, a local oscillator may be tuned to an incoming frequency and mixed with an incoming RF signal to demodulate the signal. The antenna may be coupled to the local oscillator in a manner which causes a load applied to the antenna to also be applied to the LO. By way of example, the LO may be connected to the antenna such that detuning the antenna places a load on the LO output. Application of the load to the LO may shift the LO frequency (e.g., a component frequency) which may be conveyed as a frequency attribute of responsive wireless energy signals transmitted by the tilt-sensing device. A gateway may process a received signal from the tilt-sensing device and determine that the LO frequency has shifted. Based on this determination, the gateway may determine tilt-state for the tilt-sensing device. Additionally, or alternatively, the gateway may determine a tilt-state for a moveable surface or component coupled to the tilt-sensing device. The gateway may then output a notification based on that determination. As an example, the gateway may output a notification based on that determination to a user through a user device (e.g., a laptop, a mobile phone, a tablet, wearable devices, etc.).

Existing systems for determining the state of components, such as a door, often incorporate complex sensing device(s), controllers and data processing systems. For example, a sensing system can include various orientation detection components, such as gyroscopes, magnetometers, etc., acceleration/movement components, e.g., accelerometers, etc., or a combination thereof. As an example, a contact sensor including a reed switch may be used such that a magnetic field is broken when the door opens. This information may then be transmitted to an external device, which provides an alert to the user. Such existing systems often require a power source required to drive the orientation and acceleration components, corresponding data processing components, or data transmission components (e.g., a radio transceiver). In some implementations, existing systems may be required to consume available power from a central power source increasing the power-consumption/load of the system. In other implementations, existing systems may implement additional or alternative power sources, such as a separate battery, for executing the various components of the system. Existing systems are typically associated with increased complexity by the incorporation of active components including the detection mechanisms, processing components and transmission components. Additionally, these systems are typically associated with increased power consumption of the system or further the cost and complexity of sensing systems by requiring additional power sources or increased power attributes.

One or more approaches applied by the present disclosure improve upon deficiencies or errors of existing technologies in various ways by providing for a passive approach to obtaining the tilt-state of tilt-opening doors. Illustratively, the system mitigates the need for use of active based sensor systems, such as active, battery-powered devices, to transmit state information relating to tilt-opening doors at least by providing a moveable component configured to shift orientation between at least two locations or positions with respect to an orientation of the components/surface on which the tilt-sensing device is disposed upon. The moveable component may be in or may shift to a location not proximate to the antenna. In this location, the moveable component may not affect signals transmitted by the antenna. However, in some aspects, the moveable component may shift to a location proximate to the antenna, such as based on the transition from a substantially vertical orientation to a substantially horizontal orientation (e.g., corresponding to an opening of garage door). The shift of the moveable component to the location proximate to the antenna (or more proximate relative to other positions) results in modification of the characteristics of the antenna component in the tilt-sensing device, such as detuning the frequency of transmission. A detected change in the frequency of the tilt-sensing device (e.g., tuned vs. detuned) can then be interpreted or characterized as a state of the component/surface. Illustratively, the transition of the movable component and the modification of the antenna frequency does not utilize any type of powered physical mechanism, powered circuitry or a combination thereof.

For example, when the moveable component is proximate to the antenna, the proximity of the material of the movable component causes a capacitive load (or increased capacitive load) to be applied that detunes the antenna resulting in a shifted frequency range in the transmitted signal. For example, according to some aspects of the present disclosure, the moveable component may include a plurality of ball bearings included within a compartment of the tilt-sensing device and configured to move between a first and second locations based on an orientation of the tilt-sensing device. Specifically, when the tilt-sensing device is in a substantially horizontal orientation, such as when the tilt-sensing device is coupled to a tilt-opening door that is substantially horizontal, the plurality of ball bearings are in a position physically proximate to the antenna. In this first position, the plurality of ball bearings will cause a capacitive load to be realized on the antenna such as to detune the operating frequency of the antenna. As used herein, detuning may refer to modification of frequency attributes of an antenna of the tilt sensing device.

When the tilt-sensing device is in a substantially vertical position, such as when the tilt-sensing device is coupled to a tilt-opening door that is substantially vertical, the ball bearings may shift away to a second position from the antenna of the tilt-sensing device such that the realized capacitive load on the antenna is minimized or substantially eliminated. Accordingly, in the second location, the movable component (e.g., the plurality of ball bearings) does not detune the antenna component of the tilt-sensing device.

By way of illustrative example, the tilt-sensing device may be implemented on a surface of a door that can change orientations, such as some types of garage doors. In such implementations, a substantially horizontal orientation corresponds to open state of the door, and a substantially vertical orientation corresponds to a closed state of the door. Additionally, or alternatively, intermediate orientations between substantially horizontal and substantially vertical orientations correspond to a partly open state of the door. In some aspects, there may be different levels of modification (e.g., different levels of detuning) that can be detected. In some aspects, different intermediate orientations can cause different levels of capacitive load or antenna load. For example, different levels of capacitive load may be caused by the positioning of the ball bearings with respect to the antenna. For example, when the tilt-sensing device is in a first intermediate position, the ball bearings may shift to a third position from the antenna, where the third position is halfway between the first position and the second position described above. In a second intermediate position, the ball bearings may shift to a fourth position from the antenna, closer to the first position than the second position. Other intermediate positions are also possible.

In some aspects, the orientation of the tilt-sensing device may be dependent on the placement of the tilt-sensing device on a surface of the door (e.g., a multi-panel garage door, a single panel garage door, a mailbox, a package drop box door, etc.) For example, in some aspects of the present disclosure, a tilt-sensing device may be placed at a the top or middle panel of a tilt-opening door such that a substantially horizontal orientation of the tilt-sensing device is achieved when the tilt-opening door is partly open. Additionally, or alternatively, in some aspects, a tilt-sensing device may be placed at a bottom panel of a tilt-opening door, such that a substantially horizontal orientation of the tilt-sensing device is achieved only when the tilt-opening door is completely open.

In some aspects of the present disclosure, the shift of the moveable component to a location proximate to the antenna may detune the antenna in a way that shifts the local oscillator frequency. The change or modification of the LO frequency may then be detected by a gateway, including a transceiver that receives wireless energy transmissions from the tilt-sensing device. In some aspects, the gateway may be configured to receive RF energy signals. The gateway may process a received signal from the antenna, determine whether the frequency characteristics of the signal has shifted, and output a notification based on that determination. From the received signal, the gateway may be able to extract attributes including, but not limited to, component frequencies (e.g., LO frequency) and antenna power. From the extracted attributes, the gateway may be able to determine changes with respect to expected values for those attributes, as will be discussed in more detail in the examples below.

Illustratively, the gateway may process a received signal from the antenna and determine that LO frequency has shifted. For example, the LO frequency may be included as frequency attributes of the received signal. The gateway may extract this attribute and compare it to an expected value for the LO frequency. The gateway may store an expected value for the LO frequency in memory. For example, an expected LO frequency may be included in a gateway's memory by a manufacturer, added to the gateway's memory during configuration of the gateway, added to the gateway's memory during configuration of a tilt-sensing device, stored from a previously received signal, or some combination thereof. Based on this comparison of the received LO frequency to an expected value for the LO frequency, the gateway may determine a tilt-state for the tilt-sensing device. Of course, the gateway may determine a tilt-state for a moveable surface or component coupled to the tilt-sensing device. In some aspects, the moveable surface may be a tilt-opening door (e.g., a garage door, a mailbox, a package drop box door, etc.). Based on determination of a tilt-state, the gateway may then output a notification including the tilt-state (e.g., to a user through a user device). User devices may include, but are not limited to, a laptop, a mobile phone, wearable devices, and the like.

As another example, the gateway may process attributes of a received signal and extract the power of the antenna. Illustratively, the gateway may extract the amplitude of the received signal. The gateway may then compare the antenna power to an expected value. The gateway may store an expected value for the antenna power in memory. For example, an expected antenna power may be included in a gateway's memory by a manufacturer, added to the gateway's memory during configuration of the gateway, added to the gateway's memory during configuration of a tilt-sensing device, stored from a previously received signal, or some combination thereof. Based on comparison of the extracted antenna power to an expected value for the antenna power, the gateway may determine a tilt-state for the tilt-sensing device. Of course, the gateway may determine a tilt-state for a moveable surface or component coupled to the tilt-sensing device. Based on determination of a tilt-state, the gateway may then output a notification including the tilt-state (e.g., to a user through a user device). User devices may include, but are not limited to, a laptop, a mobile phone, wearable devices, and the like.

In accordance with one or more implementations, a passive tilt-sensing device comprises a local oscillator that itself comprises one or more capacitors. Movement of metal close to a capacitor system causes a change in the amount of charge that can be stored/held by the capacitor system at a given voltage level. It will be appreciated that metal can be characterized as having an impact on the electromagnetic field or photon field (or as generating an electromagnetic field, depending on your preferred characterization), which in turn can impact the amount of charge that can be stored/held by the capacitor system. This in turn can impact the frequency of the local oscillator. In accordance with one or more implementations, a passive tag architecture is configured to compensate for a change in local oscillator frequency. In accordance with one or more implementations, a passive tag integrated circuit component determines a value based on a local oscillator frequency (e.g., a local oscillator frequency value or a compensation value utilized to compensate for a frequency change of the local oscillator). In accordance with one or more implementations, a passive tag sends a return signal representing first data, the first data including second data indicating a value determined based on a local oscillator frequency (e.g., a local oscillator frequency value or a compensation value).

According to some aspects of the present disclosure, more than one tilt-sensing device may be used. For example, more than one tilt-sensing device may be placed at different locations on a tilt-opening door to convey different tilt-state information, verify tilt-state information, and the like. In some aspects, more than one tilt-sensing device may be placed in different tilt-opening doors within the range of the same gateway. Each tilt-sensing device may transmit a unique identifier, and the gateway may differentiate between frequency characteristics of the signals using the unique identifiers.

These and other aspects of the disclosure will now be described with regard to certain examples and embodiments, which are intended to illustrate but not limit the disclosure. Although the examples and embodiments described herein will focus on, for the purpose of illustration, specific mechanisms and use cases, one of skill in the art will appreciate the examples are illustrative only and are not intended to be limiting.

Overview of Some Example Environments

FIGS. 1A-1I illustrate example systems configured to detect the tilt-state of one or more moveable surfaces. Each example system illustrated in FIGS. 1A-1I may include a reader 102, tilt-sensing device 104, and moveable surface 106 that is configurable to be moved into at least two orientations.

FIG. 1A illustrates example system 100. Additionally, the tilt-sensing device 104 is disposed on the movable surface 106 such that an orientation of the movable surface 106 corresponds to an orientation of the tilt-sensing device 104. As illustrated in FIG. 1A, the moveable surface 106 may be in substantially vertical orientation. Accordingly, the tilt-sensing device 104 may also be in a substantially vertical orientation and may be configured to move in a manner corresponding to the movement of moveable surface 106. The specific orientation of the tilt-sensing device 104, however, does not have to directly match an orientation of the movable surface 106, such as in embodiments in which the disposition of the tilt-sensing device 104 corresponds includes an angular disposition (e.g., not flush mounted).

Figure 1B:
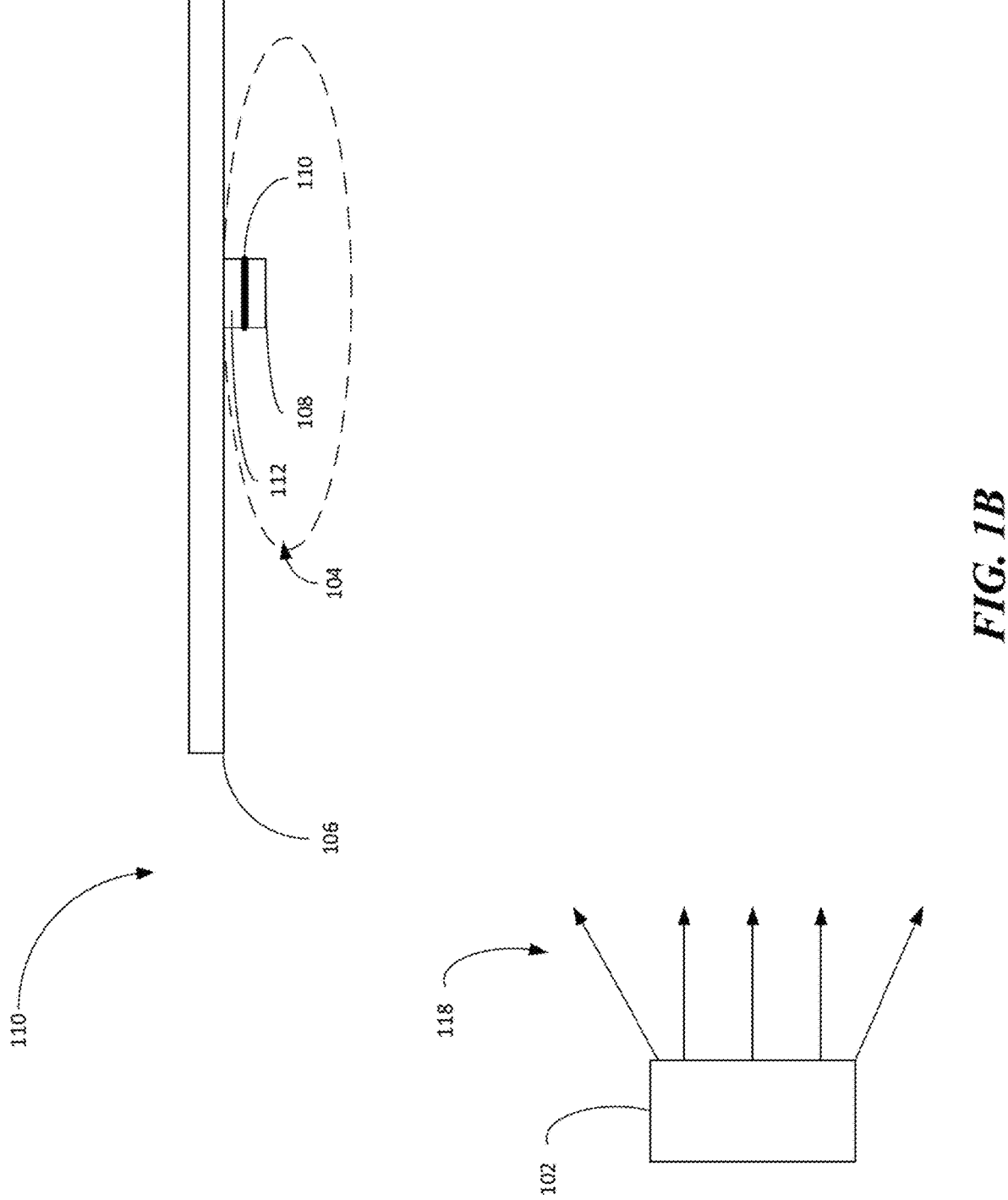

FIG. 1B illustrates example system 110 illustrating a different orientation of the movable surface 106. As illustrated in FIG. 1B, the moveable surface 106 is in substantially horizontal orientation, such as achieved when a door is in open state. In some embodiments, system 110 may reflect example system 100 after moveable surface 106 has changed position to a substantially horizontal orientation. Accordingly, the tilt-sensing device 104 may also be in a substantially horizontal orientation corresponding to the movement of moveable surface 106. As will be explained in greater detail, the transition of the orientation of the tilt-sensing device 104 from substantially vertical to substantially horizontal will also cause a movable component with the tilt-sensing device to change locations and result in a change in the frequency characteristics of signals from an antenna component (relative to transmissions when then tilt-sensing device is in a substantially vertical orientation).

Figure 1C:
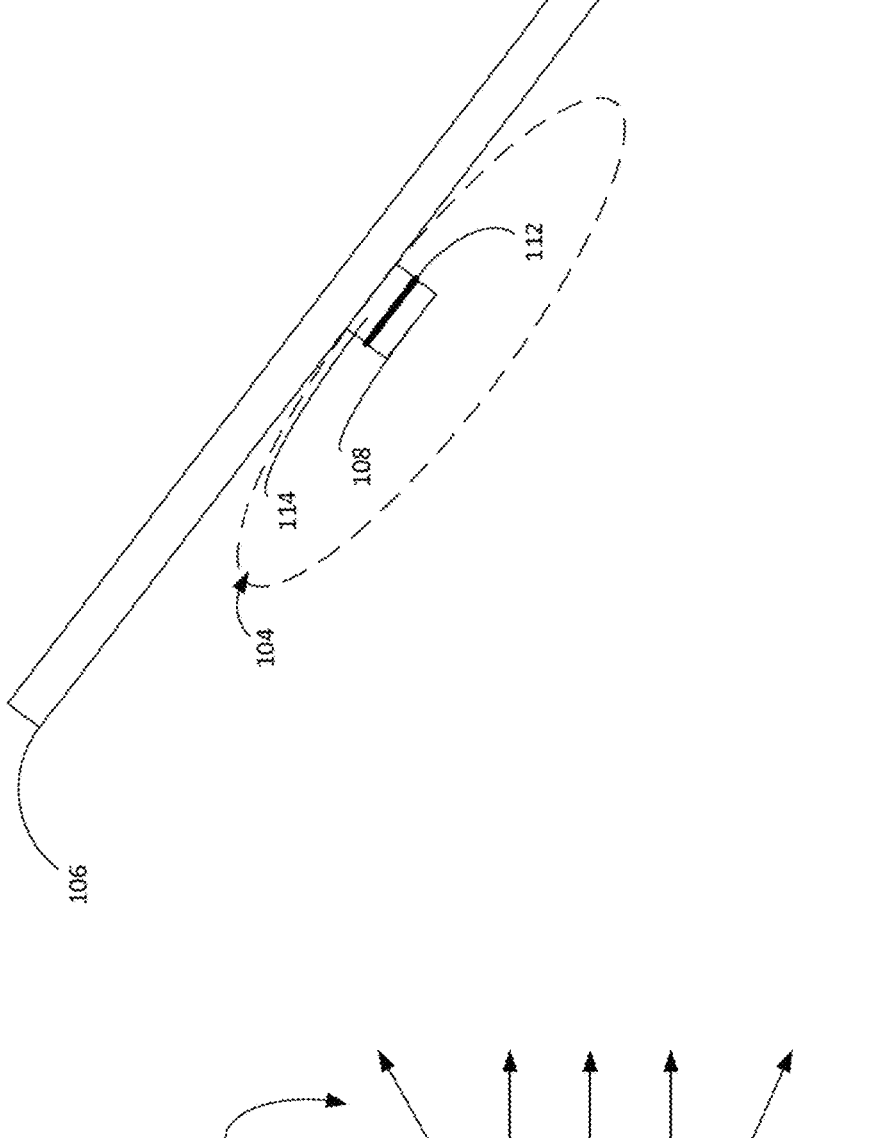

FIG. 1C illustrates example system 120. System 120 may reflect example system 100 or system 110 after the moveable surface has changed position to an angled orientation including transitioning from a substantially vertical orientation to a substantially horizontal orientation or vice-versa. Accordingly, the tilt-sensing device 104 may also be in a substantially angled orientation corresponding to the movement of moveable surface 106. As will be explained in greater detail, in some embodiments, the transition of the orientation of the tilt-sensing device 104 angled orientation will also cause a movable component with the tilt-sensing device to change locations and result in a change in the frequency characteristics of signals from an antenna component (relative to transmissions when then tilt-sensing device is in a substantially vertical orientation). The change in the frequency characteristics may be different than the change in frequency characteristics in a substantially horizontal orientation, thereby allowing for a characterization of multiple states for the movable surface 106. In other embodiments, the change in the frequency characteristics may be the same as the change in frequency characteristics in a substantially horizontal orientation, thereby allowing for a characterization of change in states for the movable surface 106 prior to achieving a full, substantially horizontal orientation.

Figure 1D:
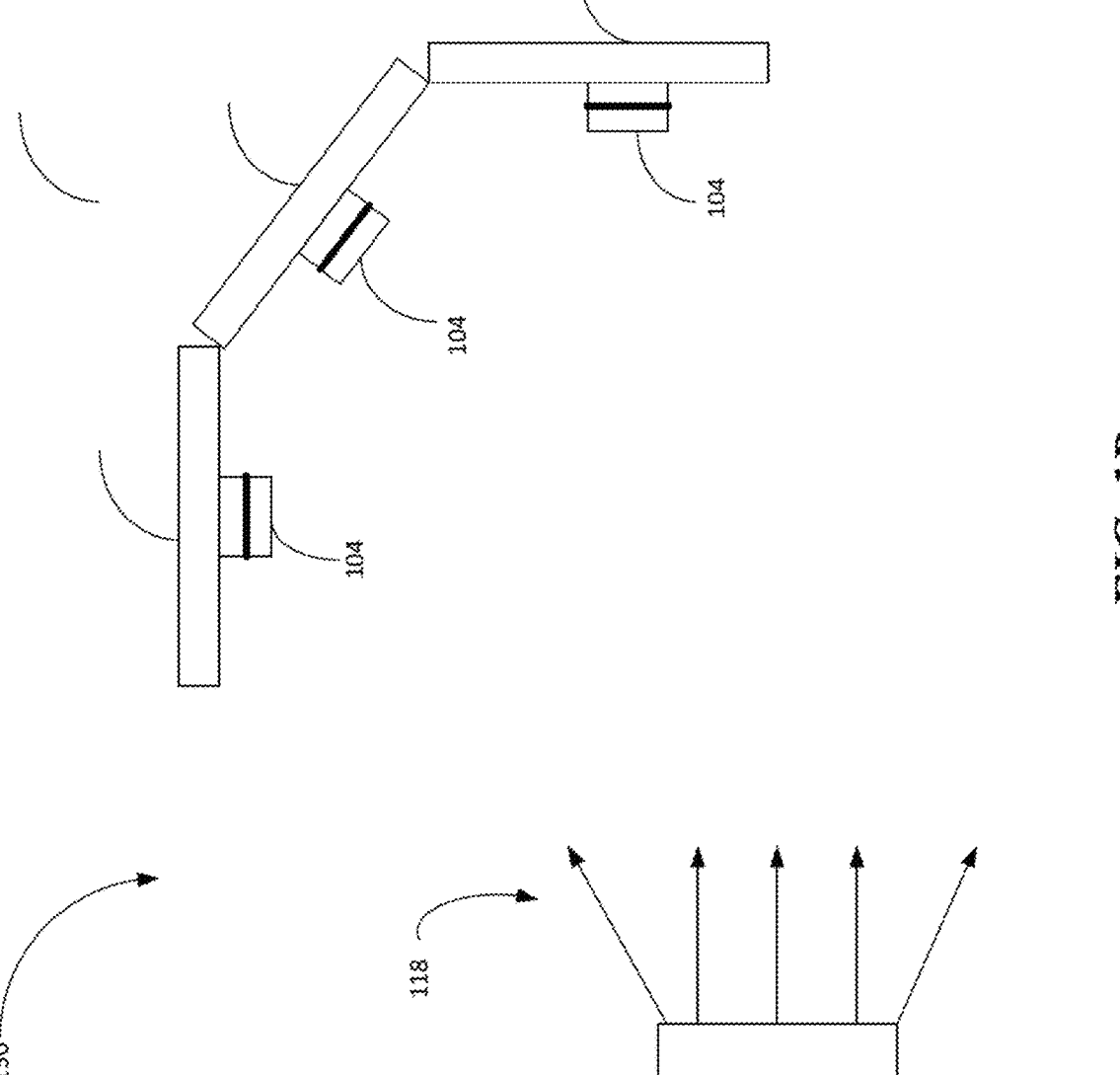

FIG. 1D illustrates example system 130. System 130 may reflect three moveable surfaces 106 (movable surfaces 106A, 106B, 106C), each surface in a different orientation. For example, movable surfaces 106A, 106B, 106C may represent different panels of a multi-panel garage door. Each surface 106A, 106B, 106C is coupled to a different tilt-sensing device 104A, 104B, 104C, where the respective tilt-sensing devices 104A, 104B, 104C share the orientation of the moveable surface 106A, 106B, 106C. In some embodiments, moveable surfaces 106A, 106B, 106C might be connected. For example, the moveable surfaces 106 might have hinges between them and are operated in conjunction. Additionally, or alternatively, moveable surfaces 106A, 106B, 106C might be associated with independently movement mechanisms (e.g., guide wire, rail system, etc.), which can cause the movable surfaces to have different orientations or have different timing or order associated with changes in orientation.

With reference to the components of individual tilt-sensing device 104 of FIGS. 1A-1I, tilt-sensing device 104 may include: a first portion 108, a separator 112, and a second portion 114. In some embodiments, first portion 108 may include a transponder and/or a transceiver, which is configured transmit a signal in response to a received signal. In some embodiments, a transponder may be included in first portion 108. For example, first portion 108 may include, antenna(s), and other electronics necessary to receive signals and transmit a signal in response to a received signal. These components may be included on a single integrated circuit chip. Additionally, or alternatively, components may be separate. In some embodiments, the transponder of first portion 108 can be passive in nature such that the transponder harvests energy from received signals. The received signals may induce a current in the transponder component to cause the transmission of a signal including information such as a unique identifier of the transponder. In other embodiments, the transponder of first portion 108 may be separately powered to not require current induced by received signals for signal transmission or otherwise utilize powered components to amplify the transmission of signals.

For example, the antenna may be separate an IC. In some embodiments, there may be multiple antennas, and a single IC. In further embodiments, each antenna may be configured to receive and/or transmit signals at different ranges. In other embodiments, there may be multiple antennas and multiple ICs, such that each antenna is paired with an IC, and each paired antenna and IC is configured to receive and transmit signals at different frequency ranges.

In some embodiments, first portion 108 may include a passive RF energy component configured to receive a signal and harvest energy from the signal to transmit a different response signal. For example, the different response signal may be generated by passive backscatter techniques which may transmit a different response signal by modifying a load (e.g., a capacitive load, resistive loads, inductive loads, etc.) applied to an antenna, and thereby modifying the reflection of a signals transmitted by the antenna. In some embodiments, first portion 108 may include an active RF energy component. The RF energy component may be configured to communicate using one or more protocols including, but not limited to, Bluetooth Low-Energy (BLE) and Long Range (LoRa) Illustratively, the RF energy component is configured to receive a signal and transmit wireless energy transmissions with assistance from a power source (e.g., a battery).

Other electronics used in conjunction with or as part of a passive or active RF energy component may include, but are not limited to, diode(s) (e.g., for rectification), capacitor(s) (e.g., for energy storage), a memory or memories, processor(s), and local oscillator(s). The local oscillator frequency may be used with a mixer to modify the frequency of a signal. For example, a local oscillator may be tuned to an incoming frequency and mixed with an incoming RF signal to demodulate the signal. LO frequency may vary with temperature. In some embodiments, a receiver that receives the signal transmitted by first portion 108 may compensate for this variation using a lookup table. LO frequency may be varied by application of an external load. Second portion 114 may be configured to provide this load by shifting a moveable component proximate to antenna(s) of tilt-sensing device 104. Second portion 114 may also be configured to remove an applied load by shifting a moveable component not proximate to antenna(s) of tilt-sensing device 104.

Frequency attributes conveyed by signals generated by first portion 108 may include, but are not limited to, a unique identifier associated each tilt-sensing device 104, temperature information (e.g., ambient temperature), antenna power, and LO frequency information. The unique identifier may be included in an advertising packet (e.g., a BLE advertising packet) transmitted as part of the generated signal. The advertising packet may be transmitted prior to transmitting LO frequency information. Information relating to LO frequency shifts may be conveyed without modifying the overall frequency of the transmitted signal. For example, first portion 108 may generate signals in any Industrial, Scientific, and Medical (ISM) radio bands, as defined in International Telecommunication Union (ITU) Radio Regulations. Illustratively, the first portion 108 may generate signals with the ISM band including the frequency range of 902-928 MHz, which a center frequency of 915 MHz. Additionally, or alternatively, the first portion 108 may generate signals with the ISM band including the frequency range of 2.4-2.5 GHz with a center frequency of 2.45 GHz. LO frequency information may be included in a first signal (e.g., by modulation). Prior to transmission of a second signal by first portion 108, the LO frequency may shift. This updated LO frequency information may be included in the second signal (e.g., by modulation) without shifting the second signal out of channel 39 of the UHF band. tilt-state With reference to separator 112, separator 112 may be between first portion and the second portion. In some embodiments, separator 112 may be configured to keep second portion 114 physically separated from first portion 108 For example, separator 112 may be configured to keep a moveable component of second portion 114 from directly contacting an antenna of first portion 108. In some embodiments, separator 112 may include an insulating material including, but not limited to, separator 112 may include, but is not limited to air, fluid, ceramic, glass, or plastic. This may help to avoid electrical issues, such as shorting components, which may affect the function of antenna(s) in first portion 108.

Figure 1E:
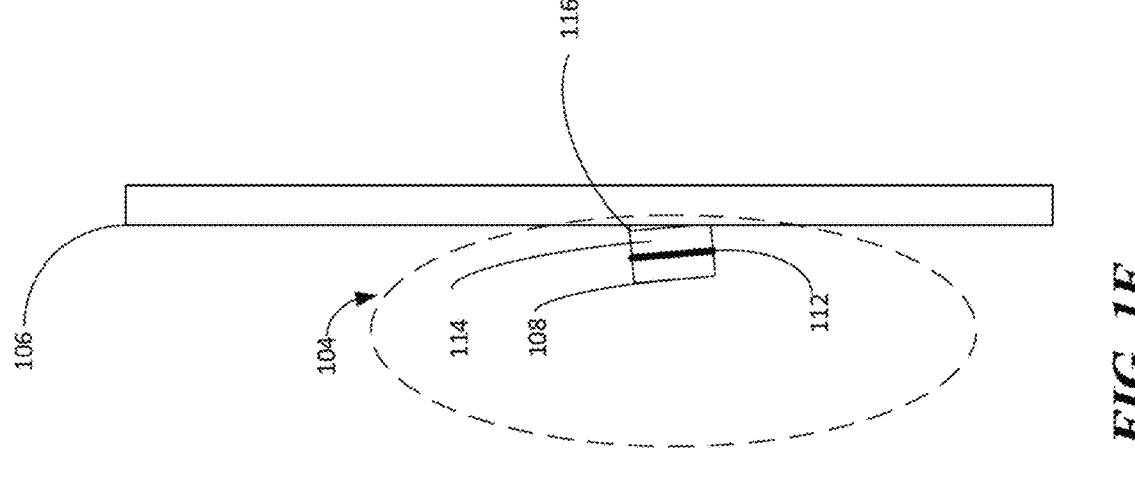
Figure 1E:
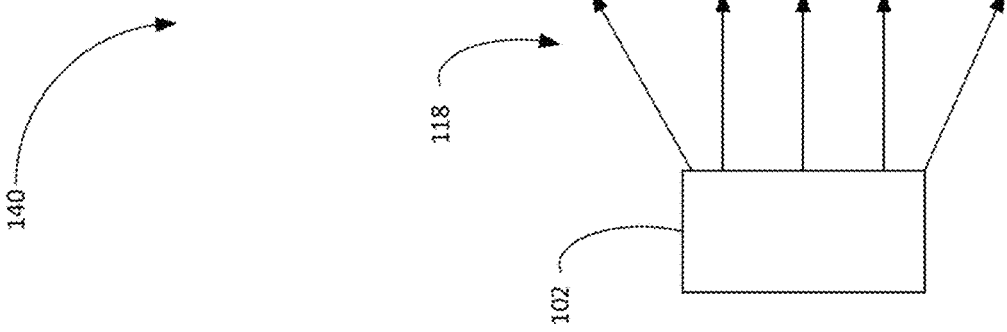
Figure 1F:
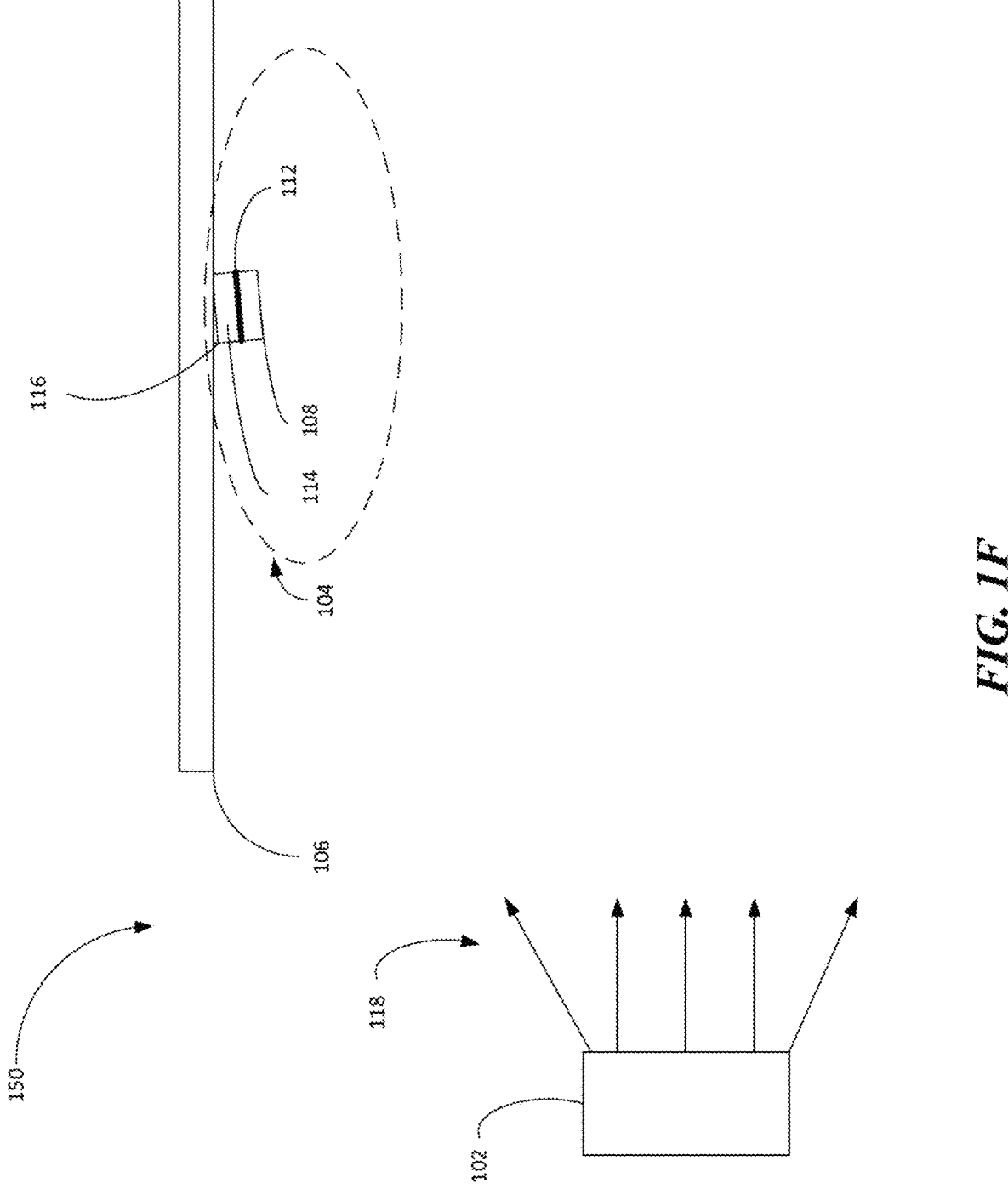
Figure 1G:
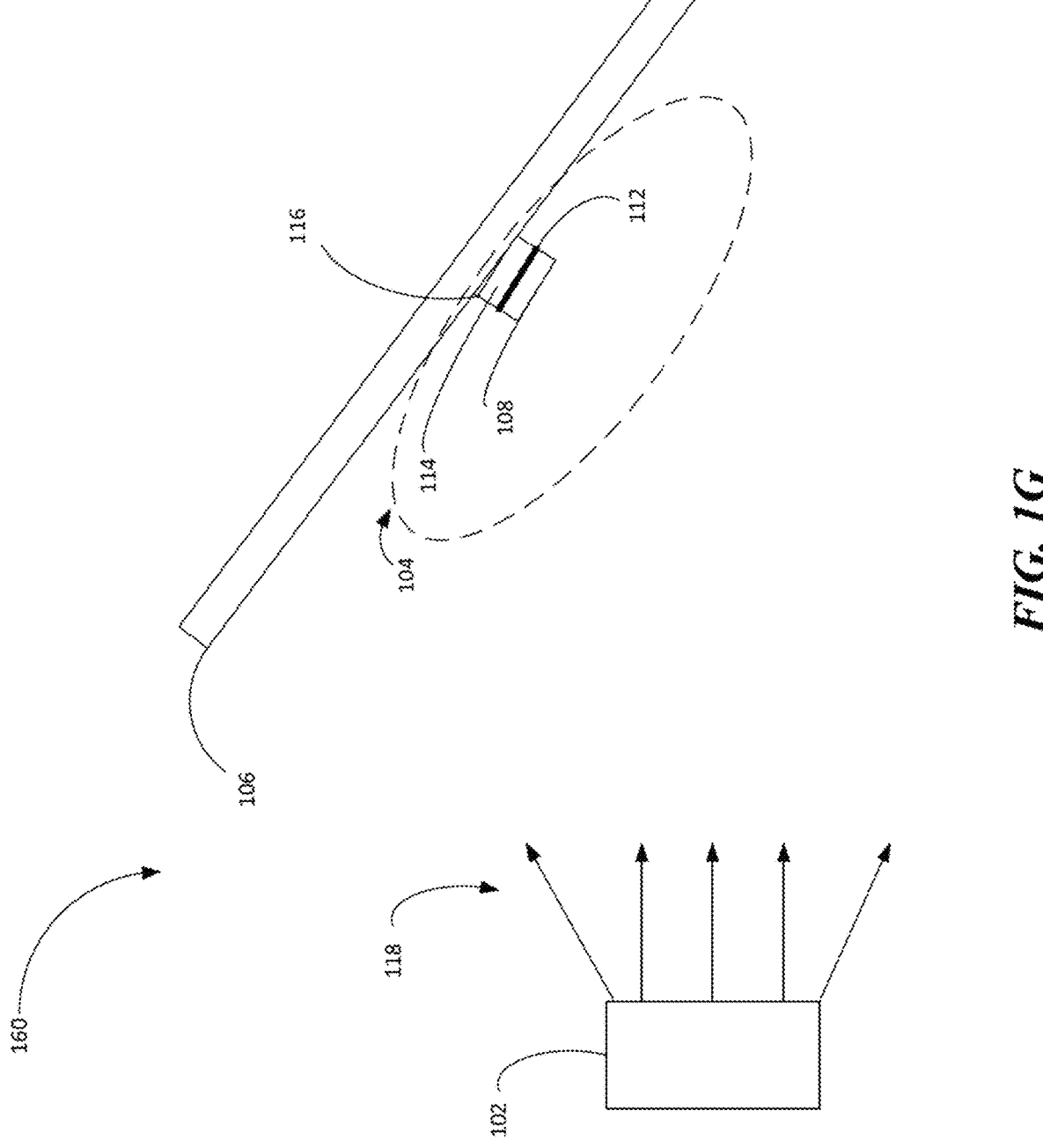
Figure 1H:
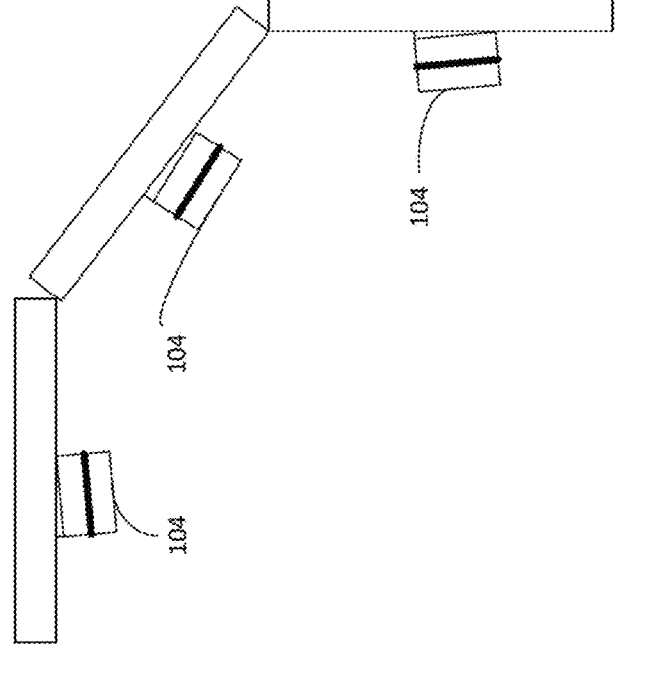
Figure 1H:
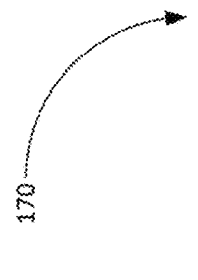
Figure 1H:
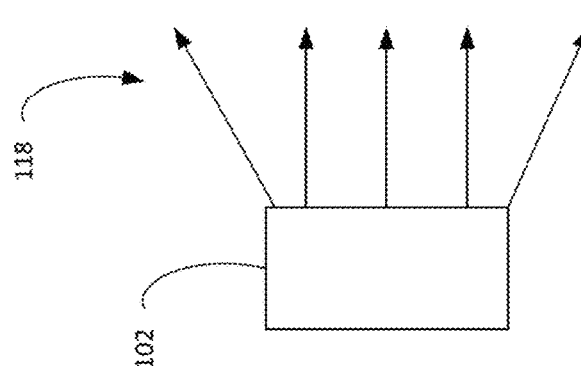
Figure 1I:
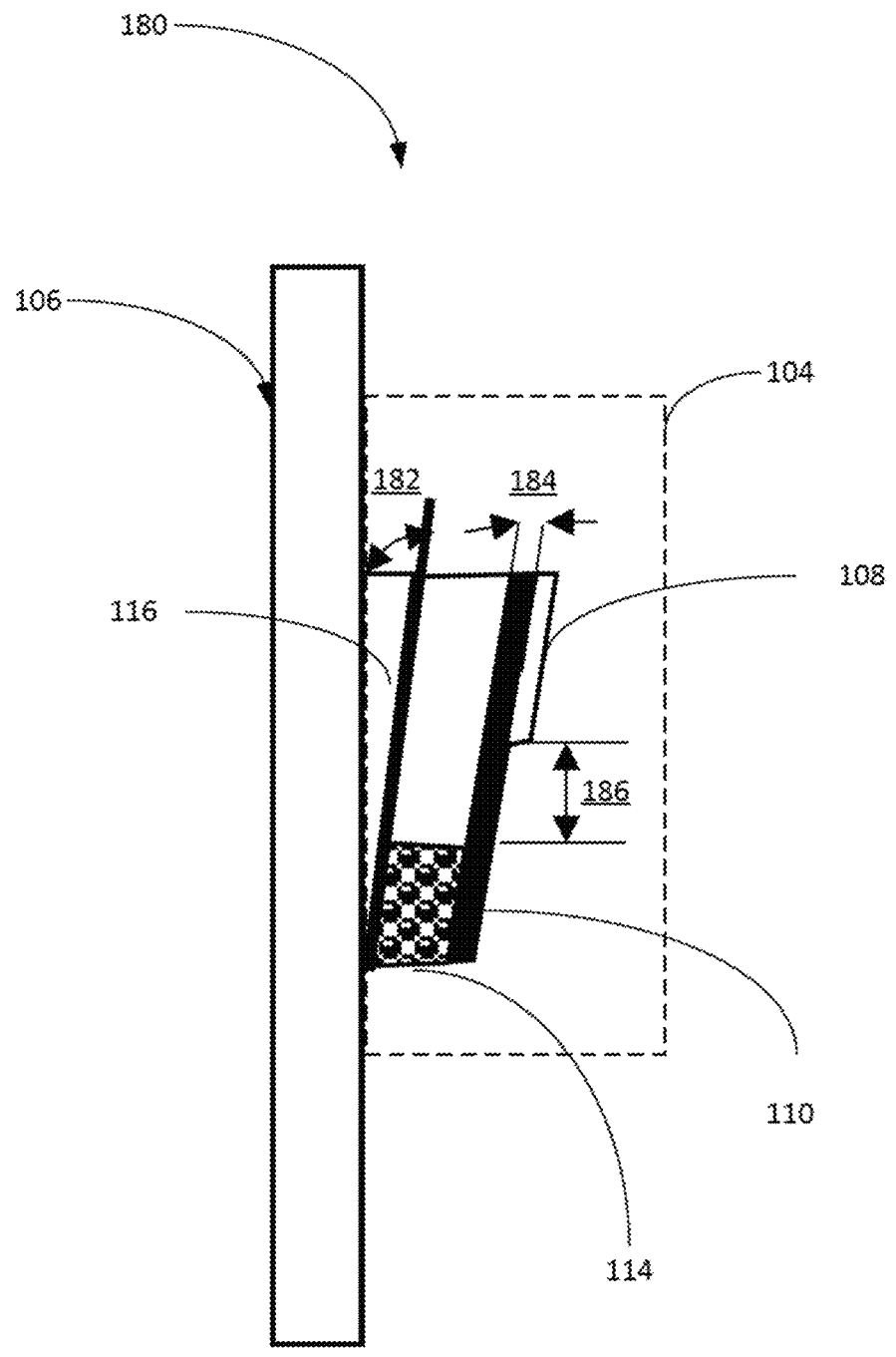

Turning briefly to FIG. 1I, FIG. 1I illustrates an example system 180, including a tilt-sensing device 104 coupled to a moveable surface 106. FIG. 1I additionally illustrates dimensions of an example embodiment of tilt-sensing device, including separator thickness 184. The separator thickness 184 may be determined to provide an effective barrier between the first portion 108 and the second portion 114 to prevent contact between a moveable component of the second portion 114 and an antenna of the first portion 108. In a non-limiting embodiment, the separator 112 may include plastic and have a thickness of 0.3 cm. The plastic included in separator 112 may have a dielectric constant of 2.8.

In some embodiments, separator 112 might be inserted into an enclosure to create first portion 108 and second portion 114. Additionally, or alternatively, first portion 108 and second portion 114 may be coupled using separator 112. For example, first portion 108 and second portion 114 may be plastic enclosures molded separately and subsequently coupled to create tilt-sensing device 104. The coupled surfaces between first portion 108 and second portion 114 may form separator 112. Additionally, or alternatively, first portion 108 and second portion 114 may be coupled by, but are not limited to being coupled by, adhesive(s), welding (e.g., PVC welding), staples(s), screws, and the like.

With reference to second portion 114, second portion 114 may include a moveable component, such as moveable component 188 of FIG. 1I, that is configured to shift between at least two locations with the second portion 114. The movable component is a passive component in that is not powered and utilizes gravitational forces to dynamically change between the at least two locations corresponding to changes in orientation in the tilt-sensing device 104. For example, the moveable component may transition as a result of gravity to at least a first location proximate to the antenna of the first portion 108 and a second location not proximate to the antenna of first portion 108. For example, the moveable component may be proximate to an antenna of first portion 108 when tilt-sensing device 104 is substantially horizontal, such as when coupled to a moveable surface 106 that is substantially horizontal. The moveable component may not be proximate to an antenna of first portion 108 when tilt-sensing device 104 is substantially vertical, such as when coupled to a moveable surface 106 that is substantially vertical. When in orientations between substantially vertical and substantially horizontal, a sub-portion of the moveable component may be proximate to an antenna of first portion 108. As explained further below, when the moveable component is in one or more locations proximate to the antenna, the antenna may realize a load that causes changes in the operating frequency(s) of elicited transmissions.

Within continued reference to FIG. 1I, there may be a gap 186 between the moveable component of the second portion 114 and the first portion 108, when the moveable surface 106 coupled to the tilt-sensing device 104 is in a substantially vertical orientation. Additionally, or alternatively, there may be a gap 186 between the moveable component of the second portion 114 and the first portion 108, the tilt-sensing device 104 is in a substantially vertical orientation. The dimension of the gap 186 may be configured to reduce the risk of false triggers, which may occur when a portion of the moveable component moves to a location proximate to the first portion 108. In some embodiments, false triggers may occur when the moveable surface 106 and/or the tilt-sensing device 104 are substantially vertical or at an angle not expected to cause a shift in the location of the moveable component. In a non-limiting embodiment, the gap 186 may be equal to 1.5 cm.

In some embodiments, the moveable component may include a dielectric material such that the moveable component applies a capacitive load when proximate to antenna(s) of first portion 108. The moveable component may apply a lesser capacitive load when a sub-portion of the moveable component is proximate to antenna(s) of first portion 108. The moveable component may include, but is not limited to, water, cardboard, ethanol, glycerine, acetonitrile, metal bearings, and isopropyl alcohol. Selection of materials may be based on dielectric constants of the materials. Additionally, or alternatively, selection of the materials may be based on temperature characteristics of the materials, such as freezing point, melting point, boiling point, or various combinations thereof. Material characteristics for some potential materials for the moveable component are provided below in Table 1 below. Note that Table 1 does not provide a complete list of materials that may be included in the moveable component, nor does it provide a complete list of materials characteristics that may be considered in selecting materials for the moveable component. Some materials, including materials not identified in Table 1, may also not be associated with properties, such as freezing temperature, boiling temperature, and the like.

TABLE 1

| List of Materials | | | |
| --- | --- | --- | --- |
| Material | Dielectric constant | Freezing Temperature | Boiling Temperature |
| Water | 78.4 | 0° C. | 100° C. |
| Ethanol | 25 | −174° C. | 78.3° C. |
| 70% Ethanol | 50 | −50° C. | 78.3° C. |
| 65% Glycerine | 40 | −416° C. | 109° C. |
| Acetonitrile | 36 | −45° C. | 82° C. |

Materials may be included in the moveable components based on ambient temperatures in the environment of a tilt-sensing device 104. For example, water may not be used, where a tilt-sensing device 104 is in an environment where temperatures are consistently below the freezing point of water. For example, a combination of materials may be included in the moveable component including, but not limited to, the materials in Table 1. For example, the moveable component may include both ball bearings and a lubricant material for the ball bearings.

The selection of the materials and the amount of materials of the movable component may affect the amount of load realized on an antenna of tilt-sensing device 104 and the corresponding amount of frequency shift in the LO frequency, which may be detectable in signals transmitted by the antenna. Selection of the materials may be specifically configured to cause known changes in component frequency. For example, use of ball bearings may result in a frequency shift of 5 MHz in the LO frequency range. Characteristics of the ball bearings, such as size, number, material, and density may impact the amount of frequency shift (e.g., in the LO frequency). Ball bearings may be selected based on these characteristics to produce a specific amount of frequency shift. For example, the density of the ball bearings distributed across the antenna in a substantially horizontal orientation may affect the capacitive load applied to the antenna. The size and/or number of the ball bearings may be selected so that the density of ball bearings grouped proximate to an antenna of tilt-sensing device 104 may be sufficient to apply a specific capacitive load. For example, in some examples, the construction or structure of the ball bearings (e.g., solid, semi-solid, or hollow structures_may also be selected to apply a specific capacitive load.

Alternatively, the material selected for the moveable component may not require specific amounts or tolerances as long as the change can be measured, and the desired effect is achieved. The angle of the tilt-sensing device 104 relative to the surface of the movable surface 106 may also impact the load applied to an antenna of tilt-sensing device 104 by the moveable component. For example, some ball bearings may be proximate to an antenna of tilt-sensing device 104 when tilt-sensing device 104 is at a 45 degree angle. However, some ball bearings may not be proximate to an antenna tilt-sensing device 104 in this orientation. The ball bearings may still shift signals transmitted by the antenna, but by less than 5 MHz in the LO frequency range.

In some embodiments, second portion 114 may include components to guide the moveable component proximate to an antenna of first portion 108 in certain orientations. For example, inclined surfaces may be included in second portion 114, as will be discussed in more detail with respect to FIGS. 4G-4H. Additionally, or alternatively, tilt-sensing device 104 may include a third portion configured to facilitate the shift of the moveable component proximate to an antenna of first portion 108 in certain orientations. In some embodiments, the third portion may also be configured, in certain orientations, to facilitate the shift of the moveable component to a location not proximate to an antenna of first portion 108. In some embodiments, the third portion may be configured between the second portion 114 and moveable surface 106. In further embodiments, the third portion may be configured to mount tilt-sensing device 104 onto moveable surface 106. the third portion may include an inclined surface, configured to facilitate shifts of the moveable component to a location proximate to antenna(s) of tilt-sensing device 104 when the tilt-sensing device when tilt-sensing device 104 is substantially horizontal. For example, when tilt-sensing device 104 is mounted to moveable surface 106 and moveable surface 106 is substantially horizontal, tilt-sensing device 104 may be substantially horizontal. The third portion may add an incline that facilitates the shift of a moveable component of second portion 114 proximate to an antenna of first portion 108. When tilt-sensing device 104 is mounted to moveable surface 106 and moveable surface 106 is substantially vertical, tilt-sensing device 104 may be substantially vertical. In this orientation, The third portion may add an incline that facilitates that the moveable component being in a location not proximate to an antenna of first portion 108.

With reference to the illustrative example of FIGS. 1E-H, FIGS. 1E-H illustrate example systems using a component 116 configured to guide moveable component over antenna of first portion when moveable surface 106 is substantially horizontal. FIG. 1E illustrates an example system 140, where example system 140 may include: reader 102, tilt-sensing device 104. In some embodiments, tilt-sensing device 104 may be coupled to component 116. In some embodiments, component 116 may be a component of tilt-sensing device. Component 116 may be used to facilitate mounting tilt-sensing device 104. By way of example, tilt-sensing device 104 may be coupled to component 116 which is coupled to moveable surface 106. In some embodiments, a portion of a back surface of tilt-sensing device 104 may be coupled to component 116 which is coupled to moveable surface 106, and the remainder of the back surface of tilt-sensing device 104 may be directly coupled to moveable surface 106.

Tilt-sensing device 104 may be coupled to moveable surface 106 either directly or through one or more mounting components such that tilt-sensing device 104 moves in a manner corresponding to the movement of moveable surface 106. For example, tilt-sensing device 104 may be coupled to moveable surface 106 such that when moveable surface 106 may be in substantially vertical orientation, tilt-sensing device 104 may also be substantially vertical orientation, as illustrated by FIG. 1A and FIG. 1E. Additionally, or alternatively, component 116 may be coupled to second portion 114 and configured to place tilt-sensing device 104 at an orientation (e.g., slight angle with respect to moveable surface) to facilitate moveable component being away from antenna of first portion 108 when tilt-sensing device 104 is in substantially vertical orientation as illustrated in FIG. 1E. Additionally, or alternatively, component 116 may be coupled to second portion 114 and configured to place first portion 108 and second portion 114 at an orientation to facilitate moveable component of second portion 114 being away from antenna of first portion 108 when moveable surface 106 is in substantially vertical orientation, such that signals transmitted by antenna don't change. With reference to FIG. 1I, the angle 182 applied by component 116 may be configured to reduce the risk of creating false triggers while facilitating the moveable component shifting proximate to the antenna when the tilt-sensing device 104 is substantially horizontal. In a non-limiting embodiment, angle 182 may be 40 degrees.

FIG. 1F illustrates example system 150, which may include including a reader 102, tilt-sensing device 104, and a moveable surface 106 in a substantially horizontal position. Example system may reflect example system 140 after moveable surface 106 has changed position to a substantially horizontal orientation. In some embodiments, component 116 may be coupled to second portion 114 and configured to place tilt-sensing device 104 at an orientation to facilitate moveable component moving proximate to antenna of first portion 108 when moveable surface 106 is in substantially horizontal orientation, such that a component frequency (e.g., LO frequency) is shifted.

FIG. 1G illustrates example system 160, which may include a reader 102, tilt-sensing device 104, and a moveable surface 106 in angled orientation. Example system 160 may reflect example system 140 or example system 150 after moveable surface 106 has changed position to an angled orientation. Additionally, or alternatively, example system 160 may reflect moveable surface 106 moving between a substantially vertical and substantially horizontal orientation. Additionally, or alternatively, example system 160 may reflect moveable surface 106 moving between a substantially horizontal and a substantially vertical orientation. In some embodiments, component 116 may be coupled to tilt-sensing device 104 and configured to place tilt-sensing device 104 at an orientation to facilitate movement of the moveable component in a proximate direction to antenna of first portion 108. When moveable surface 106 is in angled orientation, signals transmitted by the antenna may be shifted to a lesser degree than when the moveable surface 106 is in a substantially horizontal orientation. Angled orientations may include, but are not limited to, 30 degrees, 45 degrees, 60 degrees, 120 degrees, or 150 degrees.

FIG. 1H illustrates example system 170, which may include a reader 102, tilt-sensing device(s) 104, and three moveable surfaces 106, each surface in a different orientation. The moveable surfaces may be coupled together (e.g., by hinges). Additionally, or alternatively, the moveable surfaces 106 may be affixed to the same movement mechanism (e.g., a guide rail). Each moveable surface 106 may be coupled to a tilt-sensing device 104 such that the tilt-sensing device 104 shares the orientation of the moveable surface to which its coupled. Each tilt-sensing device may be coupled to component 116, which may be configured to place tilt-sensing device 104 at an orientation to facilitate moveable component moving proximate to antenna of first portion 108 when moveable surface 106 is in substantially horizontal orientation, such that signals transmitted by the antenna are shifted in frequency. Component 116 may also be configured to place tilt-sensing device 104 at an orientation to facilitate moveable component moving to a location not proximate to antenna of first portion 108 when moveable surface 106 is in substantially vertical orientation, such that signals transmitted by the antenna are not shifted in frequency. In addition, may be configured to place tilt-sensing device 104 at an orientation to facilitate moveable component moving in a direction proximate to antenna of first portion 108 when moveable surface 106 is in an angled orientation. In an angled orientation, a portion of the moveable component may be proximate to an antenna of the first portion 108, such that signals transmitted by the antenna are shifted in frequency to a lesser extent to when moveable surface 106 is in a substantially horizontal orientation.

As discussed above, example systems 100-170 illustrated in FIGS. 1A-1I may also include a reader 102. In some embodiments, reader 102 may include transceiver, may transmit signals 118. The reader 102 may be configured to receive signals from one or more devices (e.g., tilt-sensing devices, client devices). In some embodiments, reader 102 may be configured to receive signals from tilt-sensing device 104. may be configured to receive signals from more than one tilt-sensing device 104.

For example, the moveable component may transmit signals 118 to one or more tilt-sensing devices 104. The tilt-sensing devices may receive the transmitted signals 118 and respond with different signals. The signal transmitted by each tilt-sensing device may include a unique identifier for the tilt-sensing device 104, temperature information, and information relating to the tilt-state of the tilt-sensing device 104. In some embodiments, the unique identifier may be transmitted as part of an advertising packet (e.g., a BLE advertising packet). In some embodiments, information relating to the tilt-state of the tilt-sensing device 104 may be the LO Frequency. For example, the LO frequency may be shifted from an expected value when the tilt-sensing device 104 is in a substantially horizontal or in an angled orientation. The reader 102 may differentiate between signals received from multiple tilt-sensing devices using the unique identifier and thereby determine the tilt-state for each tilt-sensing device. In some embodiments, the tilt-sensing devices may be coupled to one or more tilt-opening doors, where the tilt-states may indicate whether the tilt-opening door(s) are opened or closed. Note that in some embodiments, tilt-opening door(s) may be the same as moveable surface(s) 106. Returning to the example, the reader 102 may determine, based on the tilt-state of one or more tilt-sensing devices, whether tilt-opening door(s) are opened or closed. The reader 102 may transmit a notification based on this determination. For example, the reader 102 may transmit a notification to a delivery service provider, as will be discussed in more detail with respect to FIG. 2.

In a non-limiting embodiment, multiple tilt-sensing device(s) 104 may be placed on a tilt-opening door, where different portions of the tilt-opening door change orientations at different times. For example, if a tilt-sensing device 104 is placed at the top of the tilt-opening door, its orientation may be substantially horizontal when the door is partially open. For example, a tilt-sensing device 104 placed at the top of the tilt-opening door may transmit a tilt-state indicating that the tilt-sensing device 104 is substantially horizontal when the tilt-opening door is 50% open. In some embodiments, a tilt-sensing device 104 placed at the middle of the tilt-opening door may transmit a tilt-state indicating that the tilt-sensing device 104 is substantially horizontal when the tilt-opening door is 75% open. In some embodiments, a tilt-sensing device 104 placed at the bottom of the tilt-opening door may transmit a tilt-state indicating that the tilt-sensing device 104 is substantially horizontal when the tilt-opening door is 100% open. the tilt-sensing device 104 may transmit a tilt-state that the tilt-sensing device 104 is substantially horizontal when the tilt-opening door is 50% open.

Example Tilt-Status Determination Process

Figure 2:
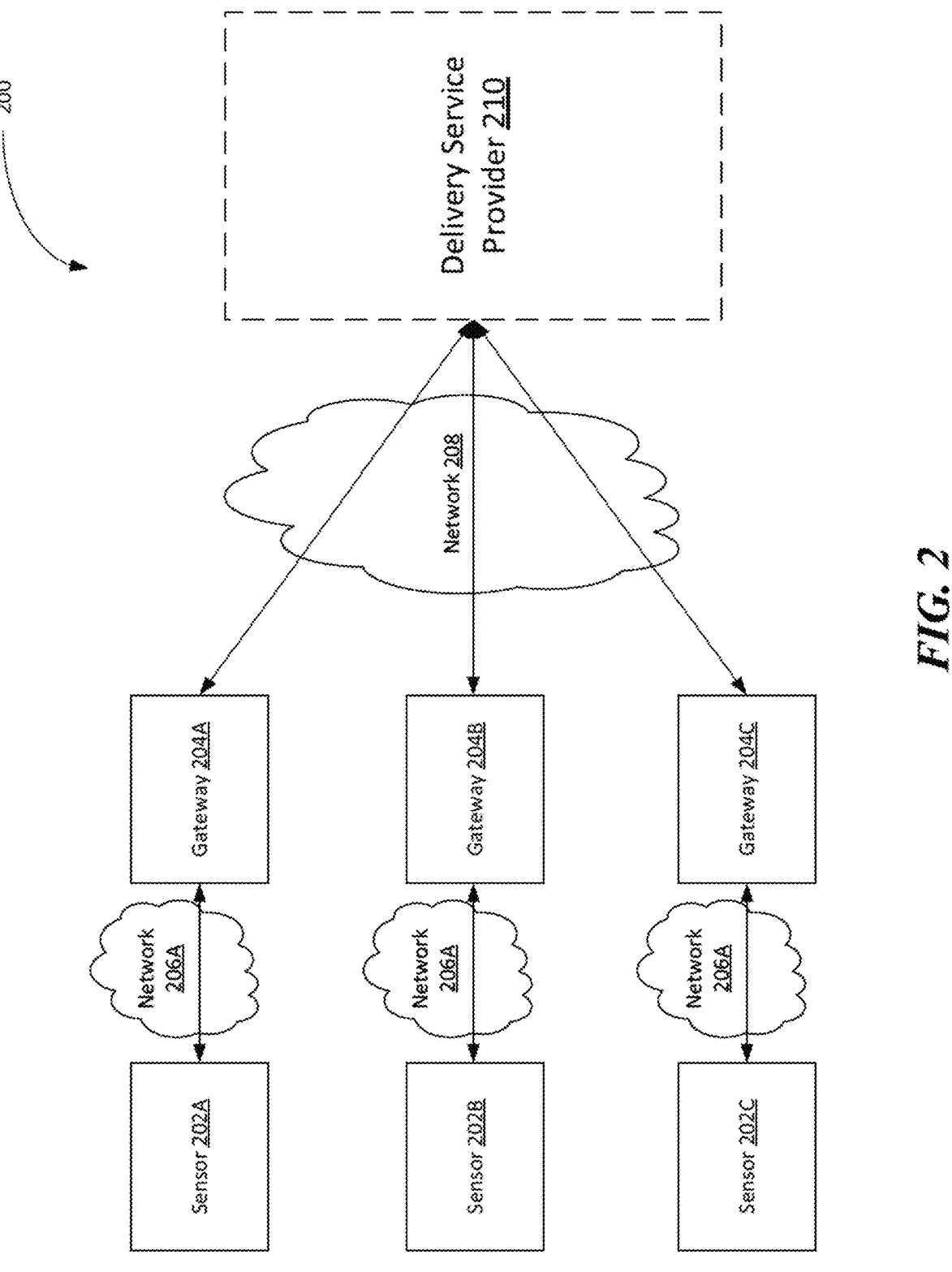
FIG. 2 illustrates example interactions between components of an example system configured to detect the tilt-state of one or more moveable surfaces.

FIG. 2 illustrates a block diagram of an embodiment of the system 200. The system 200 can include sensor 202A, 202B, 202C, gateways, 204A, 204B, 204C, and delivery service provider 210. Illustratively, a client device and a gateway are connected via network. For example, sensor 202A, 202B, 202C and gateways, 204A, 204B, 204C are connected via network 206A, 206B, and 206C, respectively. In addition, the gateways, 204A, 204B, 204C, and delivery service provider 210 are connected via the network 208. Illustratively, the various aspects associated with the delivery service provider 210 can be implemented as one or more components that are associated with one or more functions or services. The components may correspond to software modules implemented or executed by one or more customer computing devices, which may be separate stand-alone customer computing devices. Accordingly, the components of the delivery service provider 210 should be considered as a logical representation of the service, not requiring any specific implementation on one or more customer computing devices.

Network 208, as illustrated in FIG. 2 can connect any number of gateways. The network 208 is generally referred to as a backbone network. In some embodiments, a delivery service provider 210 provides the estimated location of the client devices to network-based services 126 that can utilize the location for providing the services. A delivery service provider 210 can implement a localization service 122 and data store 124. The delivery service provider 210 can provide on-demand network access to a shared pool of configurable computing resources that can be programmatically provisioned and released in response to network configuration. These resources can be dynamically provisioned and reconfigured to adjust to the variable load. The concept of "cloud computing" or "network-based computing" can thus be considered as both the applications delivered as services over the network and the hardware and software in the network service provider. In some embodiments, the network 208 may include one or more wireless networks, such as a Global System for Mobile Communications (GSM) network, a Code Division Multiple Access (CDMA) network, a Long Term Evolution (LTE) network, or any other type of wireless network. The network 208 can use protocols and components for communicating via the Internet or any of the other aforementioned types of networks. For example, the protocols used by the network 208 may include Hypertext Transfer Protocol (HTTP), HTTP Secure (HTTPS), Message Queue Telemetry Transport (MQTT), Constrained Application Protocol (CoAP), and the like. Short-range communication protocols including, but not limited to, Bluetooth Low Energy (BLE) and Radio Frequency Identification (RFID) protocols may also be used for communication. Protocols and components for communicating via the internet or any of the other aforementioned types of communication networks are well known to those skilled in the art and, thus, are not described in more detail herein. In some embodiments, the network 208 may include some or all of the same communication protocols, services, hardware, etc. Thus, although the discussion herein may describe communication between the gateway and the delivery service provider 210 via the network 208 is not limited in this manner. The various communication protocols discussed herein are merely examples, and the present application is not limited thereto.

The sensor 202A, 202B, 202C in FIG. 2 can connect to the network 206A, 206B, 206C and the gateways 204A, 204B, 204C, respectively. The sensor 202A, 202B, 202C may be representative of tilt-sensing devices coupled to moveable surfaces. The moveable sources may be doors, such as garage doors, which may need to be opened to facilitate deliveries. Sensor(s) 202A, 202B, 202C may be coupled to moveable surfaces that moves in a tilting fashion and transmit information relating to the tilt-state to a gateways 204A, 204B, or 204C through a networks 206A, 206B, or 206C.

In some embodiments, more than one sensor may transmit signals to the same gateway, and the gateway may differentiate between the sensors using a unique identifier transmitted by the sensor. The gateway may then transmit the tilt-state of the sensor(s) through network 208. In some embodiments, the gateway may first process the received signal(s) to determine a tilt-state of the moveable surface. For example, the gateway may determine that the received signal has shifted from an expected signal by a threshold amount. Based on this determination, the gateway may make a further determination on the tilt-state of the door. This tilt-state determination may be based on the received signal from more than one sensor. Once the tilt-state determination has been made the gateway may transmit the signal through network 208 to a delivery service provider 210.

In some embodiments, the sensor 202A, 202B, 202C may continuously send signals including tilt-state identifiers to a nearby gateway. The signal can be transmitted at regular intervals and contain identification information. For example, signals may be transmitted by the sensors 202A, 202B, 202C every 10 seconds. Of course, other time intervals are also possible. For example, sensors 202A, 202B, 202C every 5 seconds. In some embodiments, sensors transmitting to the same gateway may transmit signals at the same time. The gateway may process the signals simultaneously. However, in some embodiments, the gateway may process the signals at different times. Of course, in some embodiments, sensors transmitting to the same gateway may transmit signals at different times. The gateway may process these signals in the order received.

The sensors 202A, 202B, 202C may also configured to receive signals from the gateways, and modify the signals before transmitting the signals back to the gateway. For example, the gateway may transmit signals at intervals. On receipt of these signals, the sensor(s) may respond with a different signal containing tilt-state information. The signal may also contain the unique identifier of the sensor. In some embodiments, the sensor(s) may contain a passive RF energy component, which may receive a first signal transmitted by the gateway. The passive RF energy component may use the energy from the received signal to generate a modified signal, where the modified signal is modulated to contain information by varying the properties (e.g., reflectance) of an antenna of the passive RF energy component. The properties of the antenna may be varied through use of connected load(s) controlled with a local oscillator and switch(es). Additionally, or alternatively, the tilt-state information may be transmitted by shifting the signal transmitted by the antenna through use of an external load (e.g., a capacitive load) applied by a moveable component when the sensor is in a specific orientation (e.g., substantially horizontal, angled, etc.) The moveable component may apply the load by distribution of a material proximate to the antenna when the sensor is in a substantially horizontal orientation.

In some embodiments, the networks 206A, 206B, 206C can include low power wide area network (LPWAN). The networks 206A, 206B, 206C can also comprise any combination of wired and/or wireless networks, such as one or more direct communication channels, local area network, wide area network, personal area network, and/or the Internet, for example. In the example of FIG. 2, communication between the client device and the gateway may be performed via a short-range communication protocol, such as Bluetooth, Bluetooth low energy ("BLE"), RFID, Ultra High Frequency RFID ("UHF-RFID"), and/or near field communications ("NFC"). Communication in any frequency range is possible. For example, communication at ~900 MHz may occur between the sensor and gateway. In some embodiments, communication at ~2400 MHz may occur between the sensor and gateway. The networks 206A, 206B, 206C can also be the same kind as the network 208. In some embodiments, the networks 206A, 206B, 206C can individually use different kind of networks.

The gateway 204A, 204B, 204C can be deployed near the sensors in electrical communication with the gateway. For example, gateway 204A may be in the same room as sensor 202A; gateway 204B may be in the same room as sensor 202b, and gateway 204C may be in the same room as sensor 202C. The gateway 204A, 204B, 204C can be configured to communicate through the network 208 to the delivery service provider 210. As discussed above, the communication may include tilt-state information and unique identifier(s) of the sensor(s). The delivery service provider 210 may use the tilt-state information to transmit notifications to one or more client devices. The notifications may include tilt-state information relating to a door(s) (e.g., a garage door, a package locker door, etc.) coupled to the sensor(s).

Example Gateway

Figure 3:
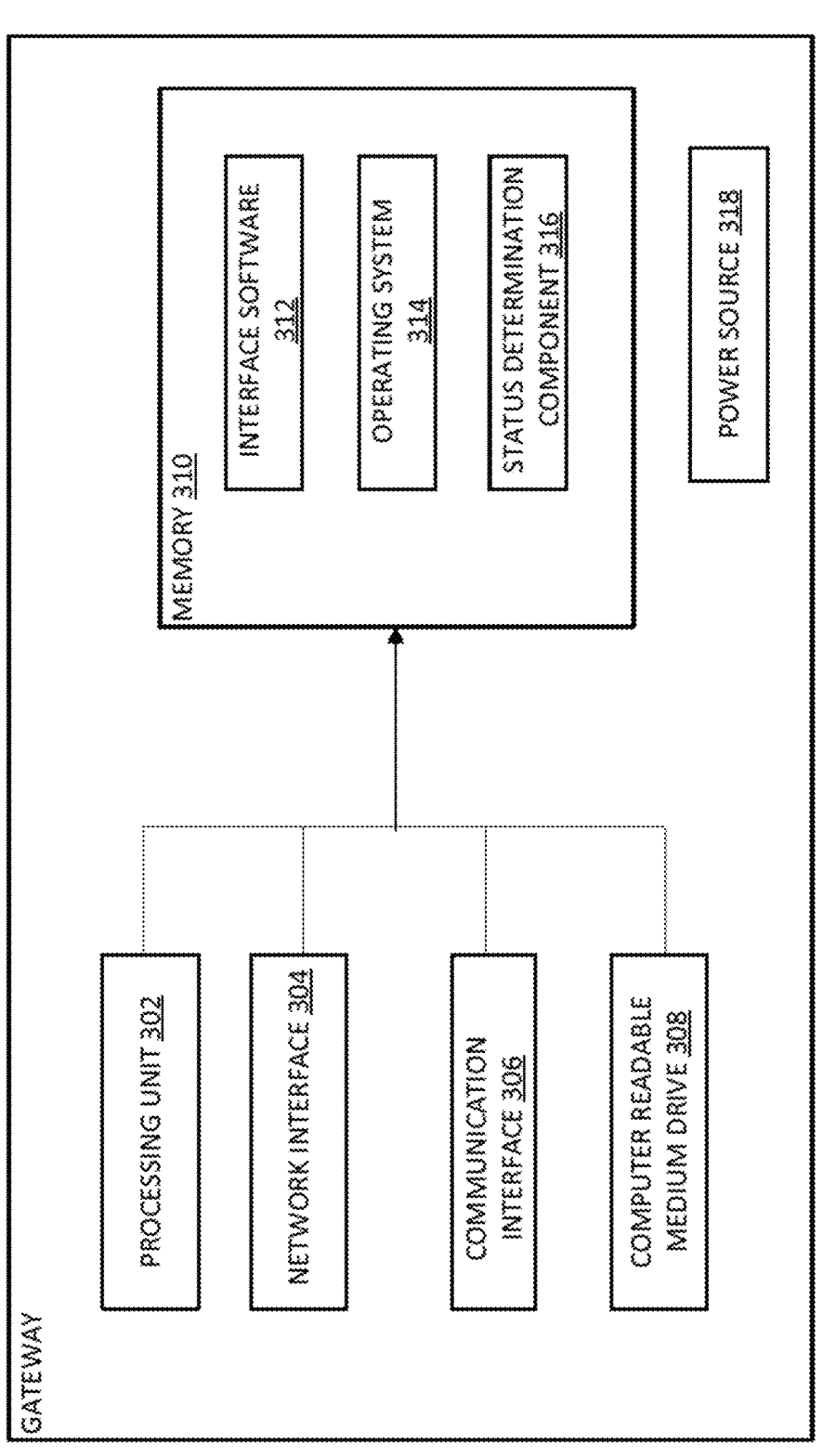
FIG. 3 schematically illustrates a gateways used to determine the tilt-state of one or more tilt sensors.

FIG. 3 illustrates one embodiment of an architecture of a gateway 204. The gateway can be configured to receive a signal (e.g., from a tilt-sensing device) from sensor(s) 202 and process the received signal to transmit to the delivery service provider 210. Additionally, or alternatively, the gateway may be configured to transmit signal for receipt by one or more sensor(s) 202. The sensor(s) 202 may subsequently transmit a signal for receipt by the gateway. The signal transmitted by the sensor(s) 202 may contain identification information and tilt-state information. In some embodiments, the sensor(s) 202 may be tilt-sensing devices comprising an antenna component and a moveable component configured to detune the antenna component, which may cause a shift in frequency of a component (e.g., a shift in LO Frequency) This frequency shift may be passively conveyed as frequency attributes in signals transmitted by the antenna without modifying the overall frequency of the antenna signal. In some embodiments, the antenna signal may be modulated to include the LO frequency information. Additionally, or alternatively, the LO frequency may affect signal timing. For example, signals transmitted by the antenna may generally include LO frequency information. Illustratively, LO frequency may impact signal timing which may be compensated for by a receiver. As such, the LO frequency may be detectable from the LO signal. When LO frequency shifts the updated LO frequency is included in signals transmitted by the antenna. The LO frequency shift may be included in signals transmitted by the antenna without modifying the frequency transmitted by the antenna. The gateway 204 may be an RF energy reader configured to receive signals from one or more tilt-sensing devices (e.g., tilt-sensing devices 104 of FIGS. 1A-1I). The gateway 204 may distinguish signals from multiple tilt-sensing devices using unique identifiers transmitted by each tilt-sensing device as part of the signal. The tilt-sensing device may include, but is not limited to, a passive RF energy component or an active RF energy component. RF energy components may include BLE components. The gateway 204 may further determine a tilt-state associated with each sensor by analyzing whether a shift in a component's frequency (e.g., LO frequency) has occurred. The gateway 204 may determine that a shift in a component's frequency has occurred by comparison of the received signal to an expected signal including, but not limited to, the signal transmitted by the gateway, a previously received signal from the sensor, or a not-yet received signal from the sensor.

The general architecture of the gateway 204 illustrated in FIG. 3 includes an arrangement of computer hardware and software components that may be used to implement aspects of the present disclosure. As illustrated, the gateway 204 includes a processing unit 302, a network interface 304, a communication interface 306, and a computer-readable medium drive 308, all of which may communicate with one another by way of a communication bus. The gateway 204 may be physical hardware components or implemented in a virtualized environment.

The network interface 304 may provide connectivity to one or more networks or client devices. In some embodiments, the network interface 304 may provide connectivity to a delivery service provider (e.g., delivery service provider 210 of FIG. 2) through a network (e.g., network 208 of FIG. 2). In some embodiments, communication interface 306 may be a component of network interface 304. Of course, communication interface 306 may be a separate from network interface 304 and communicate with network interface 304 by way of a communication bus.

Additionally, or alternatively, communication interface 306 may be used for communications between the gateway and one or more sensor(s) (e.g., tilt-sensing device(s) 104 of FIGS. 1A-1I, sensor(s) 202 of FIG. 2, etc.). Note that, in some embodiments, sensor(s) 202 may be tilt-sensing device(s) 104. The communication interface 306 may include a transceiver for communication with one or more sensor(s). The transceiver may be configured to transmit a signal to the sensor(s) and receive signal(s) in response to the transmitted signals. For example, in some embodiments, the sensors may include active RF energy components. In a non-limiting embodiment, the active RF energy components of a sensor may be configured to receive a first signal from the transceiver and respond with a second signal containing an identifier unique to the sensor. The second signal may also include tilt-state information. The tilt-state information may be embedded in the signal by the addition of a capacitive load caused by the position of a moveable component within the sensor. For example, when proximate to an antenna of the sensor, the moveable component may cause a shift in the transmitted signal (e.g., the second signal). When not proximate to the antenna of the sensor, the moveable component may not cause a shift in the transmitted signal (e.g., the second signal)

In some embodiments, the received signals from the sensor(s) may be modified versions of the transmitted signals from the gateway 204. For example, a transceiver of the communication interface 306 may transmit a first signal to a sensor. The sensor may include passive RFID components which harvest energy from the first signal and generate a second signal containing an identifier unique to the sensor. In some embodiments, a second signal may be generated through passive backscatter which reflects a portion of the first signal by the properties (e.g., reflectance) of an antenna to embed the identifier within the second signal. The second signal may also include tilt-state information. The tilt-state information may be embedded in the signal by the addition of a capacitive load caused by the position of a moveable component within the sensor. For example, when proximate to an antenna of the sensor, the moveable component may cause a shift in the transmitted signal (e.g., the second signal). When not proximate to the antenna of the sensor, the moveable component may not cause a shift in the transmitted signal (e.g., the second signal)

In some embodiments, the processing unit 302 may be connected to the communication interface 306 and/or the network interface 304. Processing unit 302 may thus receive signal, data, and instructions from the sensor(s). The processing unit 302 may also communicate to and from memory 310 and further provide output information via the communication interface 306 and/or the network interface 304. For example, the gateway 204 may signal(s) from sensor(s) via the communication interface 306. In addition, the gateway 204 may process the received signal(s), such as process signal(s) to determine a tilt-state of the sensor(s) corresponding to the signal(s). For example, gateway 204 may receive a signal from a sensor containing identification information for the sensor and information relating to the tilt-state of the sensor. The processing unit 302 may processes the signal to determine a tilt-state for the sensor. In embodiments where gateway 204 receives signal(s) from multiple sensor(s), processing unit 302 may process each signal to determine the tilt-state of each sensor. Processing unit 302 may process multiple signals simultaneously. For example, processing unit 302 may determine a random order by which to process received signal(s). Additionally, or alternatively, processing unit 302 may process multiple signals by processing each signal or each group of signal at different times. For example, processing unit 302 may process signal(s) in the order received. In a non-limiting embodiment, a first group of signals received within first time range may be processed simultaneously. A second group of signals received at a second time range may also be processed simultaneously subsequent to processing the first group of signals. In another non-limiting embodiment, a first signal received at a first time may be processed prior to a second signal processed at a second time. In another non-limiting embodiment, all signals for the same sensor received within a time range may be processed at the same time. In some embodiments, the gateway 204 may include more (or fewer) components than those shown in FIG. 3A.

The memory 310 may include computer program instructions that the processing unit 302 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the gateway 204. The memory 310 may further include computer program instructions and other information for implementing aspects of the present disclosure. For example, in one embodiment, the memory 310 includes interface software 312 for communicating with other components or services and performing service identification and infrastructure configuration associated with the identified services.

The memory may include a state determination component 316 for determining the tilt-state of one or more sensor(s) (e.g., sensor(s) 202 of FIG. 2, tilt-sensing device(s) 104 of FIGS. 1A-1I, etc.). In some embodiments, the state determination component 316 can be configured to communicate with nearby sensor(s). In some embodiments, the sensor(s) can periodically transmit a signal to its surrounding direction. For example, the sensor(s) can include an active RF energy component that periodically transmits a signal. In some embodiments, the sensor(s) may be configured to continuously transmit a signal.

However, in some embodiments, the sensor(s) may include a passive RF energy component, where the passive RF energy component transmits a signal only on receipt of a signal from the gateway 204. The state determination component 316 may be configured to cause the gateway 204 to transmit a signal continuously in order to receive signals from sensor(s). The state determination component 316 may be configured to cause the gateway 204 to periodically transmit a signal at intervals in order to receive signals from sensor(s).

The received signal(s) can include a unique identifier for the sensor and information relating to the tilt-state of the sensor. In some cases, the gateway 204 may identify the sensor based on the unique identifier. For example, the gateway 204 may process the signal and determine the unique identifier. The gateway 204 may determine the tilt-state and associate the tilt-state with the unique identifier in the memory 310. The tilt-state may also be associated with a time track the tilt-state for a sensor over time. The tilt-state for multiple sensors in communication with the gateway 204 may be stored in this manner.

In some embodiments, the gateways can process received signal(s) from sensor(s) and transmit a notification to the delivery service provider 210. The notification may relate to the tilt-state of the sensor(s). For example, the notification may include the tilt-state of each sensor in communication with the gateway. Additionally, or alternatively, the notification may include the tilt-state of a moveable surface coupled to one or more sensors.

In some embodiments, the gateway 204 may be configured to transmit a notification based on tracking the tilt-state over time. In further embodiments, the processing unit 302 may be configured to analyze the tracked tilt-state information for one or more sensor(s) and transmit a notification if the tilt-state for a sensor changes. Additionally, or alternatively, the processing unit 302 may be configured to analyze the tilt-state of multiple sensors and transmit a notification if multiple sensor(s) change in tilt-state. For example, in a non-limiting embodiment, sensor(s) may be coupled to a moveable surface in multiple places such that the tilt-state of each sensor changes at different times as the moveable surface changes orientation. The processing unit may analyze the tilt-state of the tilt sensor(s) to determine a pattern indicating that the moveable surfaces has changed orientation or is changing orientation.

Example Tilt-Sensing Device

Figures 4A, 4B:
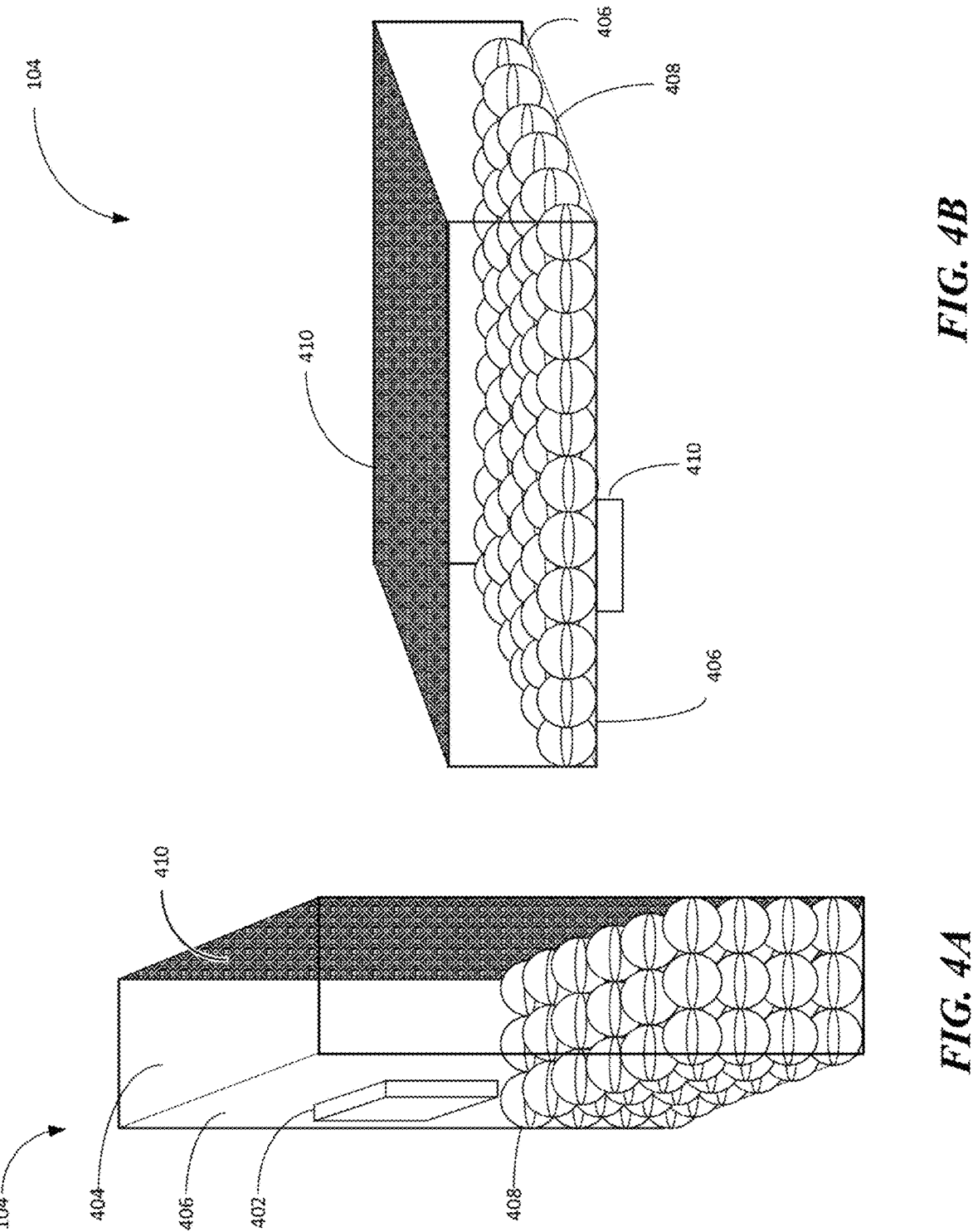
FIGS. 4A-4H illustrate example embodiments of a tilt-sensing device in various orientations.
Figure 4C:
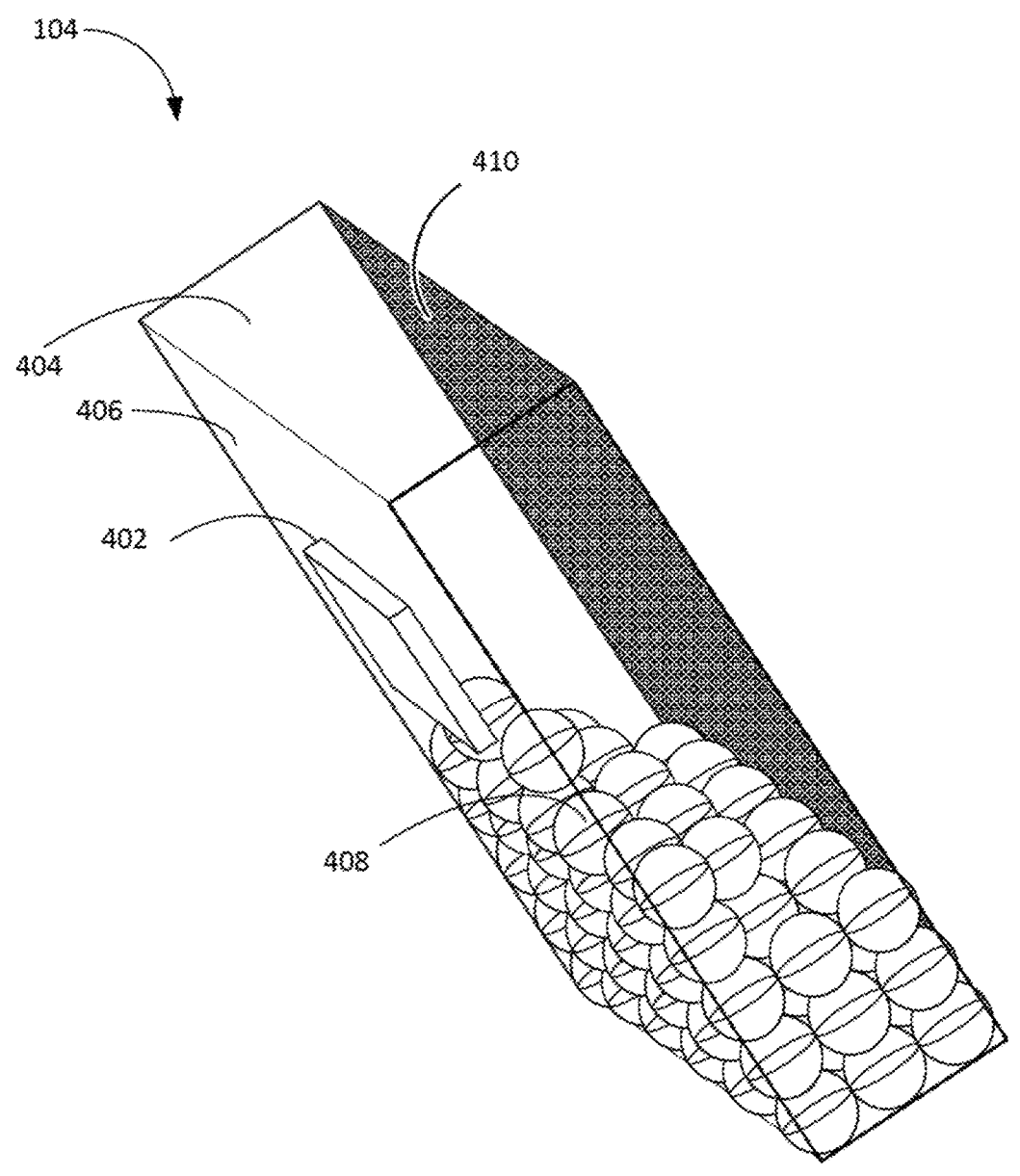

FIGS. 4A-4H illustrate example embodiments of a tilt-sensing device in various orientations. FIG. 4A illustrates a tilt-sensing device 104 in a substantially vertical orientation. FIG. 4B illustrates a tilt-sensing device 104 in a substantially horizontal orientation, and FIG. 4C illustrates tilt-sensing device 104 in an angled orientation. The tilt-sensing device 104 includes a first portion 402 and a second portion 404. In some embodiments, the first portion 402 may be the same as the first portion 108 of FIGS. 1A-1I, and the second portion 404 may be the same as the second portion 114 of FIGS. 1A-1I.

The first portion 402 may include an antenna. For example, the antenna may be a part of an RF energy component. The RF energy component may include, but is not limited to, diode(s) (e.g., for rectification), capacitor(s) (e.g., for energy storage), a memory or memories, processor(s), and local oscillator(s). In some embodiments, the RF energy component may be a passive RF energy component. Additionally, or alternatively, in some embodiments, the RF energy component may be an active RF energy component. In some embodiments, the RF energy component may be a BLE component.

The first portion 402 may include a separator (e.g., separator 112 of FIGS. 1A-1I) configured to keep the first portion 402 separated from the second portion 404. Additionally, or alternatively, the separator may be part of the second portion 404. For example, the second portion may have a front surface 406 which serves as a separator between the moveable component 408 and the first portion 402. Additionally, or alternatively, the separator may be a separate component between the first portion 402 and second portion 404. In further embodiments, the separator may be an enclosure coupled to first portion 402 and front surface 406 of second portion 404, such that a gap is created between first portion 402 and front surface 406 of second portion 404. The gap may be filled with any material. In a non-limiting embodiment, the gap may be filled with air. In another embodiment, the separator may be a solid piece of material (e.g., no gap of another material) coupled to the first portion 402 and second portion 404. In a non-limiting embodiment, the separator may be a solid piece made of a plastic material with a dielectric component of 2.8 and have a thickness of 0.3 cm.

For example, the second portion 114 may include a moveable component 408 between front surface 406 and back surface 410 configured to shift locations as tilt-sensing device changes orientation. The moveable component 408 may be configured to shift locations without the use of battery power or power from a wired power source. For example, the moveable component 408 may be configured to shift locations as the tilt-sensing device 104 changes orientation due in part to gravitational force. In some embodiments, the moveable component 408 may include one part. In other embodiments, the moveable component 408 may include multiple parts. For example, such as illustrated in FIGS. 4A-4B, the moveable component 408 may include ball bearings. In a non-limiting embodiment, the ball bearings may be metal. Of course, the moveable component 408 may include other materials, combination of materials, combination of shapes/sizes and the likes. For example, the moveable component may include, but is not limited to, the materials listed in Table 1. In some embodiments, a lubricant may be included with the ball bearings to facilitate movement of the ball bearings. The lubricant may include, but is not limited to, grease, graphite, machine oil, boron nitride, and the like). In some embodiments, the moveable component 408 may include only fluid(s).

As discussed above, the moveable component 408 may shift in orientation based on gravitational force. For example, as illustrated in FIG. 4A, the moveable component 408 may be in a first location that is not proximate to first portion 402. The moveable component 408 may be in the first location when the tilt-sensing device 104 is substantially vertical. In some embodiments, when in the first location the moveable component 408 may be separated from first portion 402 by a gap (e.g., gap 186 of FIG. 1I). In a non-limiting embodiment, the gap may be 1.5 cm. When the moveable component is in the first location, component frequencies (e.g., LO frequency) of first portion 402 are not impacted by the moveable component 408. The second portion can further include additional components, such as magnets, which may assist in the transition of the movable component or allow the movable component to remain in one of the various states (e.g., assist in the gravitational forces applied to the movable component).

However, as illustrated in FIG. 4B, the moveable component 408 may also be in a second location that is proximate to the first portion 402. For example, material of moveable component 408 may be distributed behind a front surface 406 of second portion 404. This may cause a capacitive load to be applied to first portion 402. For example, the capacitive load applied by moveable component 408 in the second location, may detune an antenna of first portion 402. Detuning the antenna of first portion 402 may cause a shift in the LO Frequency of the antenna. The presence of absence of this shift may convey tilt-state information in signals transmitted by the antenna. In a non-limiting embodiment, the shift may be a 5 MHz shift.

In some embodiments, tilt-sensing device 104 may shift between the substantially vertical orientation illustrated in FIG. 4A to the substantially horizontal orientation illustrated in FIG. 4B. Additionally, or alternatively, tilt-sensing device 104 may shift between the substantially horizontal orientation illustrated in FIG. 4B to the substantially vertical orientation illustrated in FIG. 4A. In some embodiments, the moveable component 408 may be in a third location between the first location and the second location. For example, the tilt-sensing device 104 may be in an angled orientation between the substantially vertical orientation illustrated in FIG. 1A and the substantially horizontal orientation illustrated in FIG. 4B. For example, the tilt-sensing device 104 may be in the angled orientation illustrated in FIG. 4C. At the third location, moveable component 408 may be distributed in a third location such that a portion of the moveable component 408 is proximate to first portion 402. This may cause an antenna of first portion 402 to become detuned, such that component frequencies (e.g., LO Frequency) may be shifted. Frequency attributes relating to shifts component frequencies may be conveyed in signals transmitted by the antenna are shifted in frequency. Illustratively, transmitted signals may be modulated to include LO frequency information. The frequency shift caused by moveable component 408 at the third location may be less than the shift caused by moveable component 408 at the second location. In a non-limiting embodiment, the shift caused by a moveable component 408 at a second location may be 5 MHz, while the shift caused by moveable component 408 at the third location may be less than 5 MHz.

Additionally, or alternatively, an amount of moveable component 408 may be selected such that moveable component 408 does not cause a shift in signals transmitted by the antenna in angled orientations. For example, the amount of moveable component 408 may be selected such that a gap (e.g., gap 186 of FIG. 1I) exists between moveable component 408 and first portion 402 when tilt-sensing device 104 is in a substantially vertical orientation. The gap may allow moveable component 408 to shift locations when tilt-sensing device 104 is in angled orientation(s) without affecting signals transmitted by first portion 402. Additionally, or alternatively, the gap may allow moveable component 408 to shift locations when tilt-sensing device 104 is in angled orientation(s) without component frequencies of first portion 402.

While one angle is illustrated in FIGS. 4C, a person of ordinary skill in the art would understand that any angle between substantially horizontal position and a substantially vertical position is possible. For example, tilt-sensing device 104 may have, but is not limited to, an angled orientations corresponding to 30 degrees, 45 degrees and 60 degrees with respect to the substantially horizontal position. The moveable component 408 may be at different positions depending on the angle. For example, a larger portion of the moveable component 408 may be proximate to first portion 402 when the angle is 60 degrees with respect to the substantially horizontal position then when the angle is 30 degrees with respect to the substantially horizontal position.

Figures 4D, 4E:
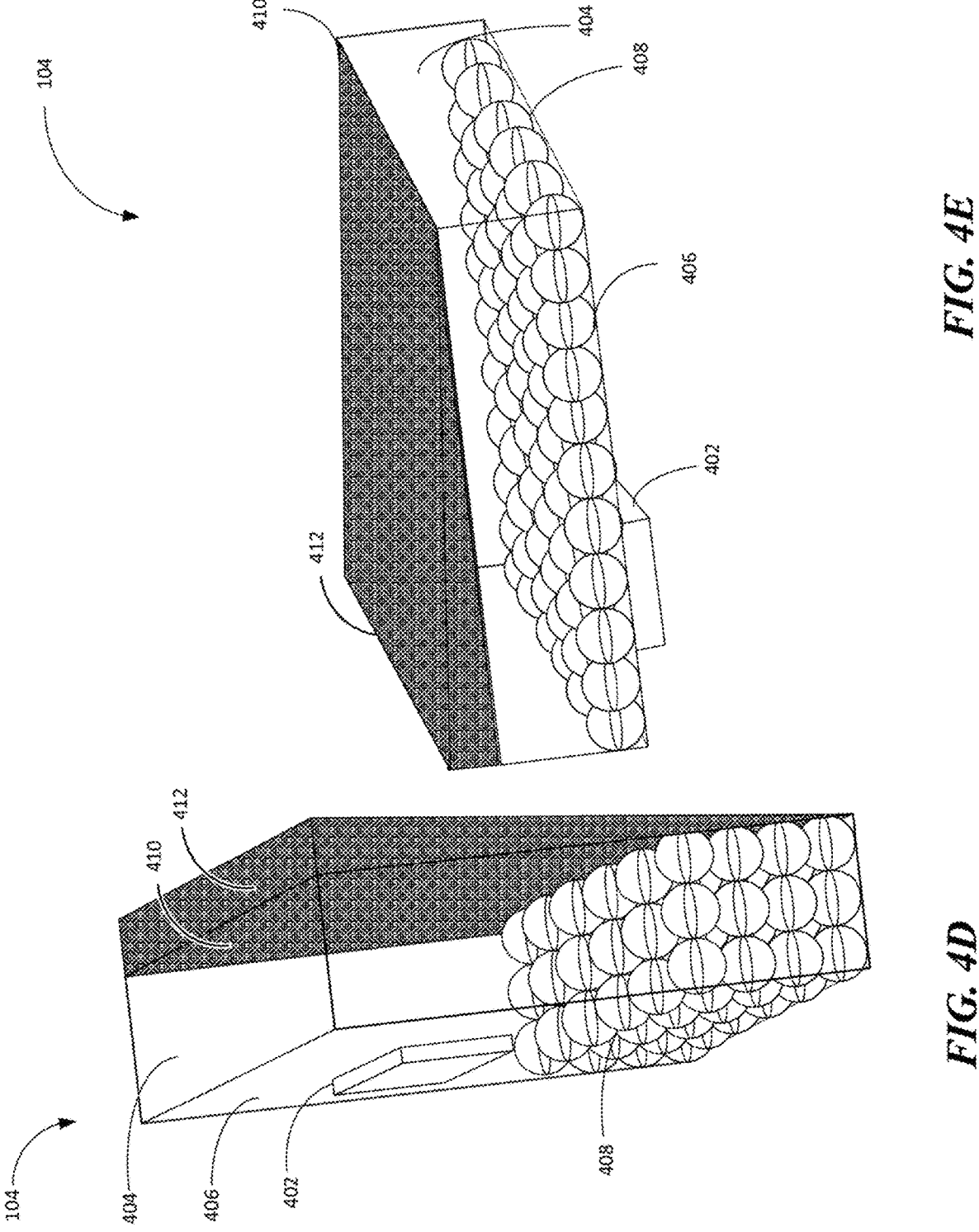
Figure 4F:
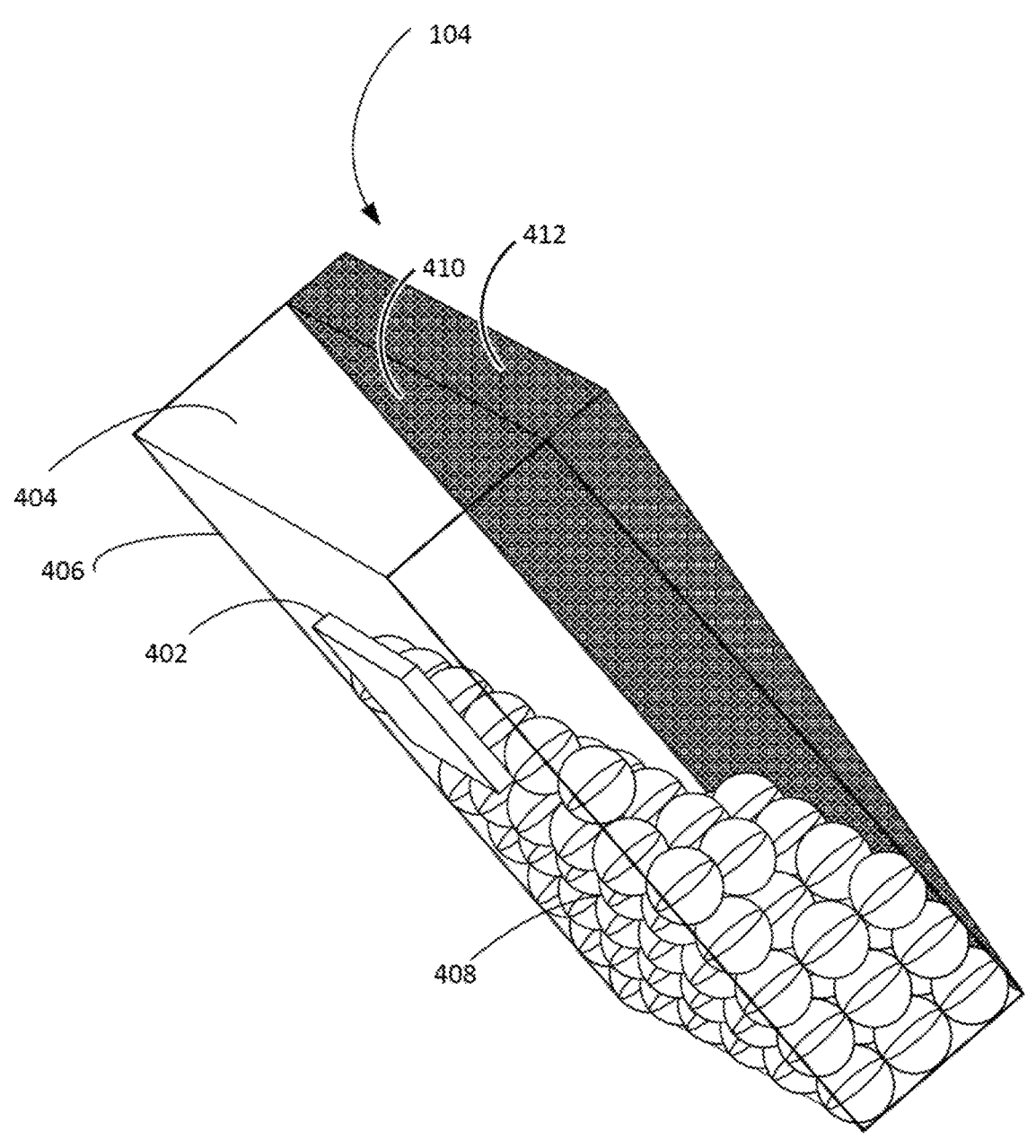

In some embodiments, an additional component may be used to facilitate shifting of moveable component 408 as the tilt-sensing device 104 changes orientations. For example, FIGS. 4D-F illustrate the additional of a guide 412. FIG. 4D illustrates tilt-sensing device 104 in a substantially vertical orientation. FIG. 4E illustrates tilt-sensing device 104 in a substantially horizontal orientation, and FIG. 4F illustrates tilt-sensing device 104 in an angled orientation. Guide 412 may be configured to facilitate shifting of moveable component 408 by providing an inclined surface to facilitate the application of gravitational force on moveable component 408. The angle of the inclined surface provided by the guide 412 may impact the degree to which the guide 412 facilitates shifting of moveable component 408. For example, an angle of 30 degrees with respect to a substantially vertical surface may be less helpful in facilitating movement of moveable component 408 than an angle of 45 degrees with respect to a substantially vertical surface. In a non-limiting embodiment, the inclined surface provided by guide 412 may be 45 degrees with respect to a substantially vertical surface.

Figures 4G, 4H:

In some embodiments, other guides may be used to facilitate shifting of moveable component 408 as tilt-sensing device 104 changes orientation. FIGS. 4G-4H illustrate tilt-sensing device 104 in an angled orientation. For example, as shown in FIGS. 4G-4H a guide 414 may be provided on the front of tilt-sensing device 104. In some embodiments, guide 414 may be a component of second portion 404. Guide 414 may be used in addition to other guide components. For example, as shown in FIG. 4H, both guide 412 and guide 414 may be used to shifting of moveable component 408 as tilt-sensing device 104 changes orientation.

Figure 5:
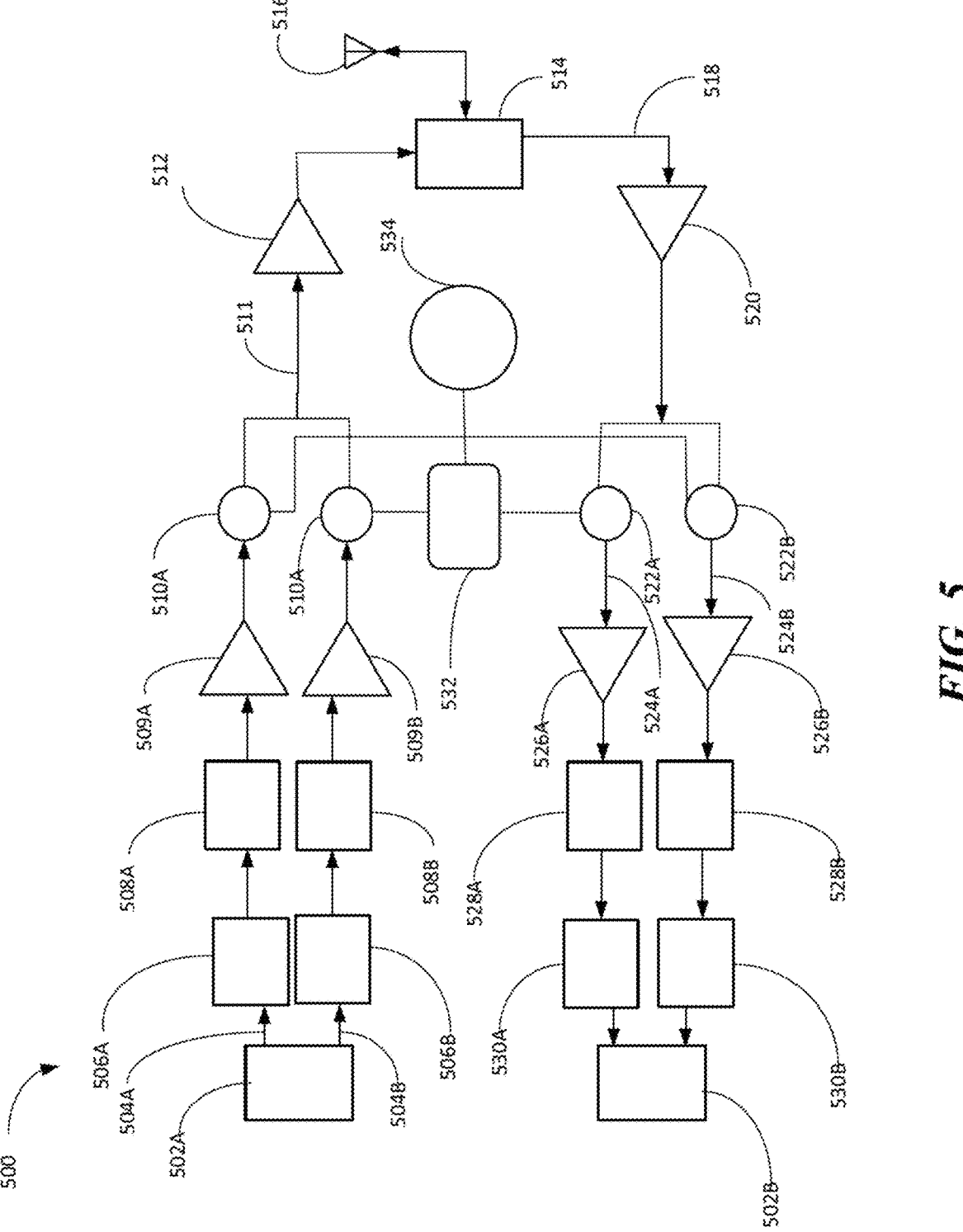
FIG. 5 illustrates a circuit diagram of an example transceiver of a tilt-sensing device in accordance with some embodiments.

FIG. 5 illustrates a circuit diagram of an example transceiver 500 of a tilt-sensing device (e.g., tilt-sensing device 104 of FIG. 1) in accordance with some embodiments. Additionally, or alternatively, transceiver 500 may be a transceiver of a reader (e.g., reader 102 of FIG. 1). The transceiver 500 may include baseband processors 502, where baseband processor 502A may control signals transmitted by the tilt-sensing device 104 and baseband processor 502B may control signals received by the tilt-sensing device 104. For example, the baseband processor 502 may generate in-phase (I) signal 504A and quadrature (Q) signal 504B for transmission of a signal. Illustratively, I signal 504A and Q signal 504B may be 90 degrees out of phase. For example, I signal 504A may be a cosine waveform, and Q signal may be a sine waveform. I signal 504A and Q signal 504B may be amplitude modulated to capture information to be transmitted, such as an identifier of tilt-sensing device 104. For example, I signal 504A and Q signal 504B may be processed by one or mixers, such as mixer 510A and mixer 510B, to generate an output signal. Accordingly, varying the amplitude of the I signal 504A with respect to the Q signal 504B or varying the amplitude of the Q signal 504B with respect to the I signal 504B may encode information, such as an identifier of the tilt-sensing device 104, into the output signal transmitted through the antenna 516. Additionally, or alternatively, the output signal may be modulated in terms of frequency to encode the identifier of the tilt-sensing device 104.

By way of illustration. a first local oscillator of baseband processor 502A may be employed to generate a carrier signal. This carrier signal may become the I signal 504A, and baseband processor 502A may apply a 90 degree phase shift to the carrier signal to generate the Q signal. The signals 504 may be processed by digital-to-analog converters (DAC) 506 to convert the digital signal generated by baseband processor 502A to an analog signal for further processing and/or for output by antenna 516. DAC 506A may convert the I signal 504A, and DAC 506B may convert the Q signal 504B. In some embodiments, after the signals 504 are processed by DACs 506, the signals 504 may be processed by low pass filters (LPF) 508, which allows specified low frequency components of signals 504 to pass. LPF 508A may process I signal 504A and LPF 508B may process q signal 504B. Signals 504 may then be amplified using programmable gain amplifiers (PGAs) 509. In other words, the PGAs 509 may amplify the signals. PGA 509A may amplify I signal 504A and PGA 509B may amplify Q signal 504B. After amplification by PGAs 509, the signals 504 may be mixed using mixers 510. Mixer 510 may receive I signal 504A, and mixer 510B may receive q signal 504B. Mixer 510A and 510B may work together to generate initial output signal 511. Initial output signal 511 may be further amplified with power amplifier 512 before passing to transmit receive unit (TR/RX) 514. TR/RX 514 may transmit the signal.

In some embodiments, the antenna be detuned by the distribution of a moveable component (e.g., moveable component 408 of FIGS. 4A-H) proximate to antenna 516. For example, the moveable component may detune antenna 516, antenna 516 may be coupled to the output of a local oscillator in a manner that causes the local oscillator (LO) frequency to shift when the antenna 516 is detuned. This may impact the generation of an initial output signal 511. Illustratively, a component of initial output signal 511 representing the LO frequency may reflect the shift caused by the detuning of antenna 516.

In some embodiments, transceiver 500 may receive a signal through antenna 516 this may pass to TR/RX 514. TR/RX 514 may transmit the received signal 518 to low noise amplifier (LNA) 520, which may amplify received signal 518. LNA 520 may transmit received signal 518 to mixers 522. Mixers 522 may include mixer 522A, and mixer 522B. Mixer 522A and mixer 522B may work together to separate 518 into I signal 524A and Q signal 524B. Signals 524 may then be transmitted to PGAS 526, which amplify the signals 524. PGA 526A may amplify the I signal 524A and PGA 526B may amplify the Q signal 524B. PGAs 526 may then transmit signals 524 to LPFs 528. LPFs may allow low-frequency components of signals 524 to pass. LPF 528A may allow low-frequency components of I signal 524A to pass, and LPF 528B may allow low-frequency components of Q signal 524B to pass. LPFs 528 may transmit the signals 524 to analog to digital converters (ADCs) 530, which may convert signals 524 from analog signals to digital signals. ADC 530A may convert I signal 524A to a digital signal, and ADC 530B may convert Q signal 524B to a digital signal. Signals 524 may then pass to baseband processor 502B, which may analyze signals 524 to determine whether further action (e.g., a response signal) is required.

In some embodiments, a phase shifter 532 and a phase-locked loop (PLL) 524 may be employed to vary the phase and/or frequency of an output with respect to a reference. Illustratively, phase shifter 532 may receive I signal 504A and I signal 524A as input. These signals may represent local oscillator (LO) frequencies. For example, I signal 504A may represent the frequency of a first LO of baseband processor 502A and I signal 524A may reflect frequency of a second LO of baseband processor 502B. PLL 534 may use I signal 504A and I signal 524A as references to vary the frequency of its output until the reference and output are phase and frequency matched. In some embodiments, the PLL 534 may capture that an LO frequency (e.g., of tilt-sensing device 104 of FIG. 1) has shifted based on a comparison of the output signal and reference signals. PLL 534 may than transmit this information to a controller, such as baseband processor 502A or baseband processor 502B.

Example Placement of Tilt-Sensing Devices on Tilt-Opening Doors

Figure 6A:
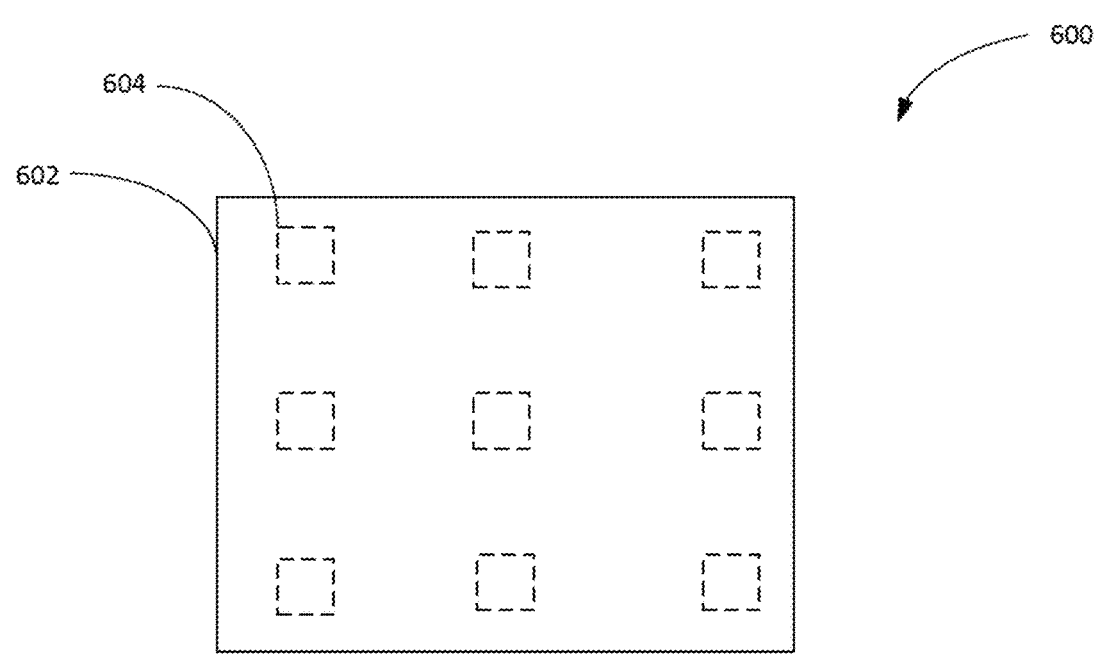
FIGS. 6A-6E represents example placements of tilt-sensing devices on moveable surface(s).

FIGS. 6A-6E illustrates example placements of tilt-sensing devices on moveable surface(s). FIG. 6A illustrates an example system 600 including a moveable surface 602. In some embodiments, moveable surface 602 may be the same as moveable surface 106 of FIGS. 1A-1I. In some embodiments, placements 604 represent potential locations for a tilt-sensing device (e.g., tilt-sensing device 104 of FIGS. 1A-1I and FIGS. 4A-H). A tilt-sensing device may be coupled to moveable surface 602 at any of placements 604. Additionally, or alternatively, multiple tilt-sensing devices may be coupled to moveable surface 602, each at a different placement 604. For example, a first tilt-sensing device may be coupled to moveable surface 602 in a placement 604 at the top of moveable surface 602. A second tilt-sensing device may be coupled to moveable surface 602 in a placement 604 at the middle of moveable surface 602, and a third tilt-sensing device may be coupled to moveable surface 602 in a placement 604 at the bottom of moveable surface 602. Each tilt-sensing device may transmit a unique identifier in addition to tilt-sensing information (e.g., LO frequency information). An external computing device (e.g., reader 102 of FIGS. 1A-1I, gateway(s) 204 of FIGS. 2-3) may differentiate signals received from each sensor based on their unique identifiers.

Figure 6B:
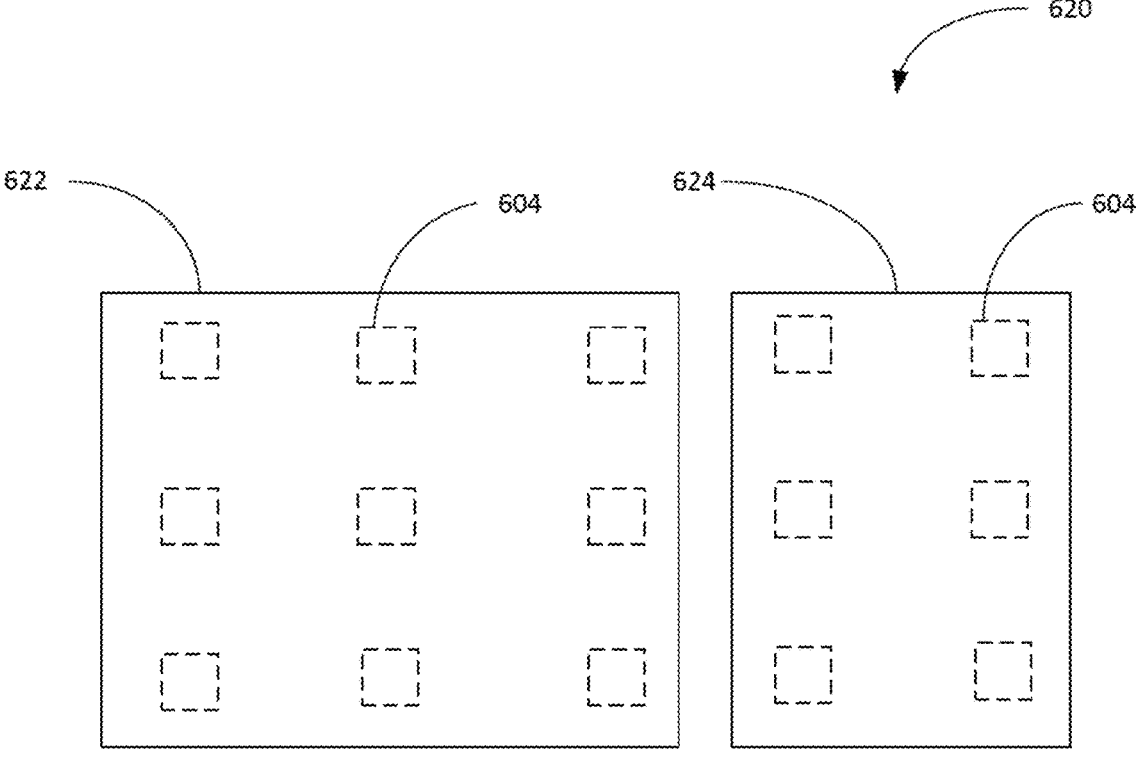

FIG. 6B illustrates an example system 620 including a moveable surface 622 and a moveable surface 624. In some embodiments, moveable surface 622 may be the same as moveable surface 106 of FIGS. 1A-1I. In some embodiments, moveable surface 624 may be the same as moveable surface 106 of FIGS. 1A-1I. In some embodiments the size of moveable surfaces 622 and moveable surface 624 may differ. Additionally, or alternatively, the number of potential placements on each moveable surface may differ. For example, movable surface 622 may have nine potential placements, and moveably surface 624 may have six potential placements. Each tilt-sensing device may transmit a unique identifier in addition to tilt-sensing information. An external computing device (e.g., reader 102 of FIGS. 1A-1I, gateway(s) 204 of FIGS. 2-3) may differentiate signals received from each sensor based on their unique identifiers. In some embodiments, the external computing device may associate the unique identifiers with an identifier for a moveable surface. For example, the external computing device may receive information on the moveable surface coupled to a tilt-sensing device during configuration. This may allow the external computing device to track the movements of multiple tilt-sensing devices on the same moveable surface.

Figure 6C:
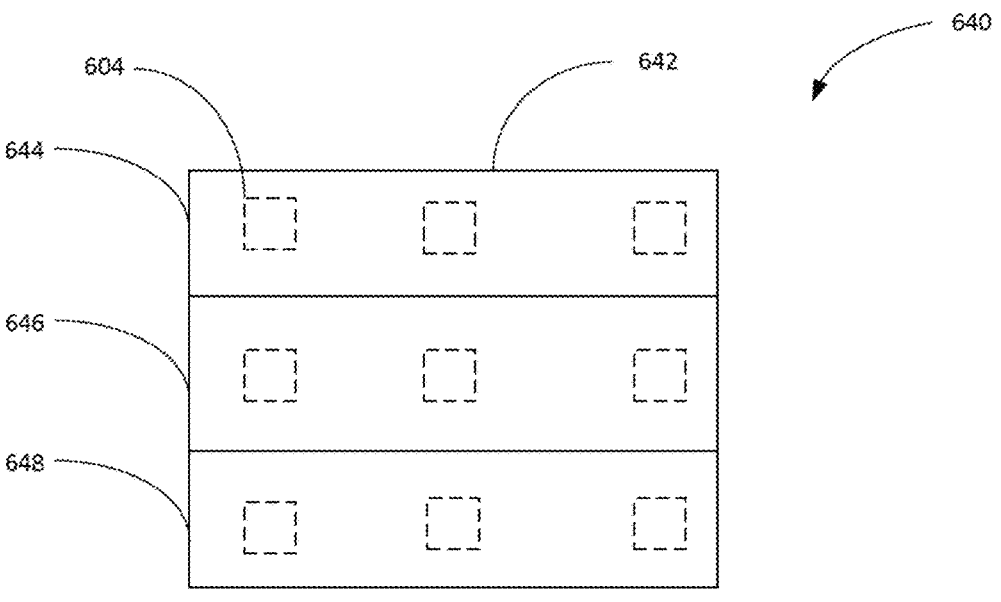

In some embodiments, different portions of a moveable surface may change orientation at different rates. FIG. 6C represents an example system including a movable surface 642, where moveable surface 642 includes a top portion 644, a middle portion 646, and a bottom portion 648. For example, with respect to FIG. 6C, a top portion 644 of a moveable surface 640 of may change orientation at a different time than middle portion 646 and bottom portion 648. In a non-limiting embodiment, moveable surface 642 may be a tilt-opening door. Each portion of the tilt-opening door may change orientation from substantially vertical to substantially horizontal as the tilt-opening door opens. In some embodiments, changes in orientation of the tilt-sensing device may result in detuning of the antenna of the tilt-sensing device through application of a capacitive load by a moveable component of the tilt-sensing device. When the tilt-opening door opens, the top portion 644 may change orientation first, followed by middle portion 646, and finally by the bottom portion 648.

Placing a tilt-sensing device in top portion 644 may provide an indication that the tilt-opening door is 50% open because top portion 644 may change orientation first. Placing a tilt-sensing device in middle portion 646 may provide an indication that the tilt-opening door is 75% open because middle portion 646 may change orientation second. Finally, placing a tilt-sensing device in bottom portion 648 may provide an indication that the tilt-opening door is 100% open because bottom portion 648 may change orientation last. In some embodiments, multiple tilt-sensing devices may be coupled to a placements at different portions of moveable surface 642 in order to allow determination, by an external device, different state(es) of moveable surface 642 including, but not limited to: open, partially open, and closed.

The reverse may be true as the tilt-opening door closes. Each portion of the tilt-opening door may change orientation from substantially horizontal to substantially vertical as the tilt-opening door closes. When the tilt-opening door closes, the bottom portion 648 may change orientation first, followed by middle portion 646, and finally by the top portion 644. Placing a tilt-sensing device in bottom portion 648 may provide an indication that the tilt-opening door is 50% closed because bottom portion 648 may change orientation first. Placing a tilt-sensing device in middle portion 646 may provide an indication that the tilt-opening door is 75% closed because middle portion 646 may change orientation second. Finally, placing a tilt-sensing device in top portion 644 may provide an indication that the tilt-opening door is 100% closed because top portion 644 may change orientation last. In some embodiments, multiple tilt-sensing devices may be coupled to a placements at different portions of moveable surface 642 in order to allow determination, by an external device, different state(es) of moveable surface 642 including, but not limited to: open, partially open, and closed.

Figure 6D:
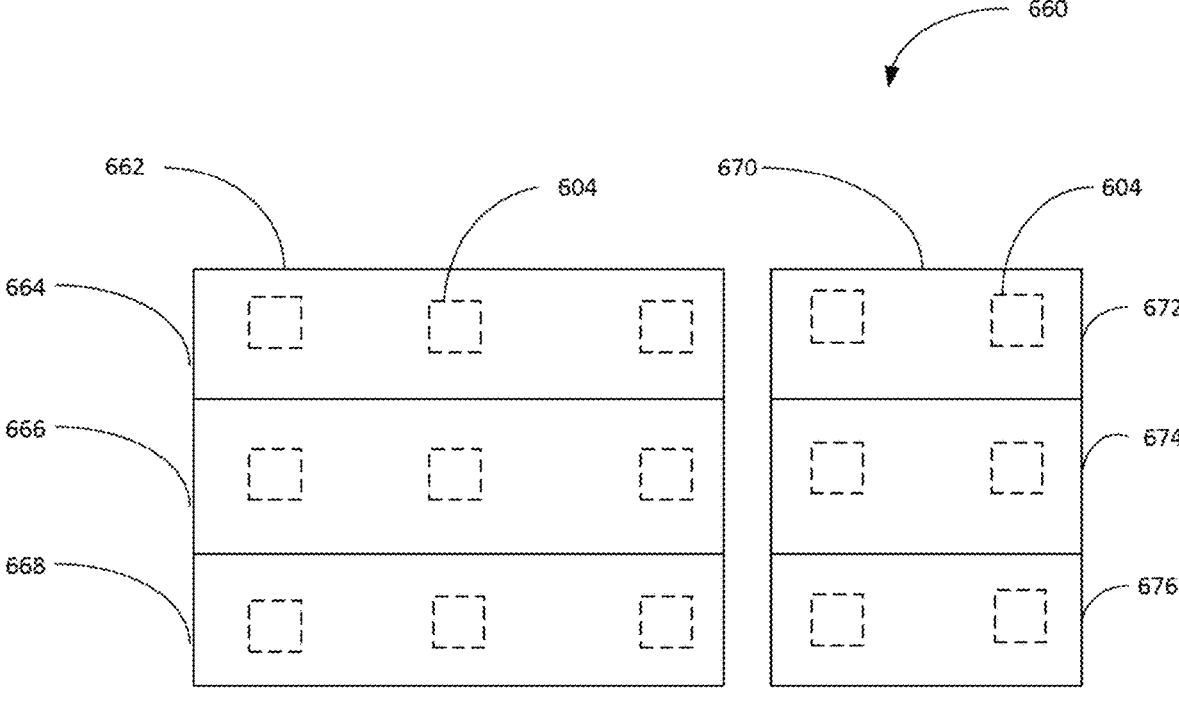

In some embodiments, there may be multiple moveable surfaces near each other. Each moveable surface may contain portions that change orientation at different times as the moveable surface changes in its overall orientation. For example, FIG. 6D illustrates moveable surfaces 662 and 670. Moveable surface 662 may include a top portion 664, a middle portion 666, and a bottom portion 668. Each portion may change orientation at a different time as moveable surface 662 changes in its overall orientation, as discussed above with respect to FIG. 6C. Moveable surface 670 may include a top portion 672, a middle portion 674, and a bottom portion 676. Each portion may change orientation at a different time as moveable surface 670 changes in its overall orientation, as discussed above with respect to FIG. 6C.

Figure 6E:
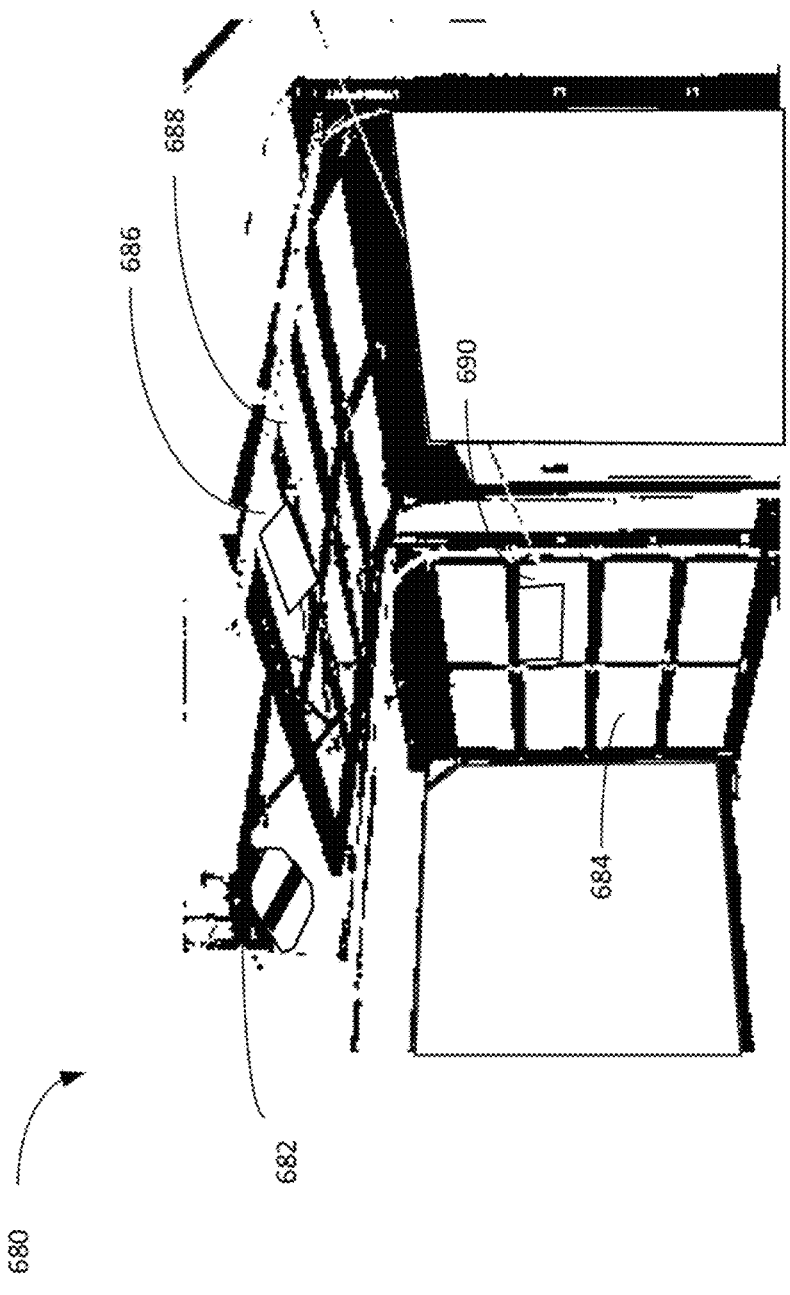

In some embodiments, the moveable surface may be a garage door, where each portion of the garage door may change orientation at different times, as discussed above with respect to FIG. 6C. FIG. 6E depicts an example system 680 including a first garage door 684 and a second garage door.

Example Method for Determining Tilt-Status

Figure 7:
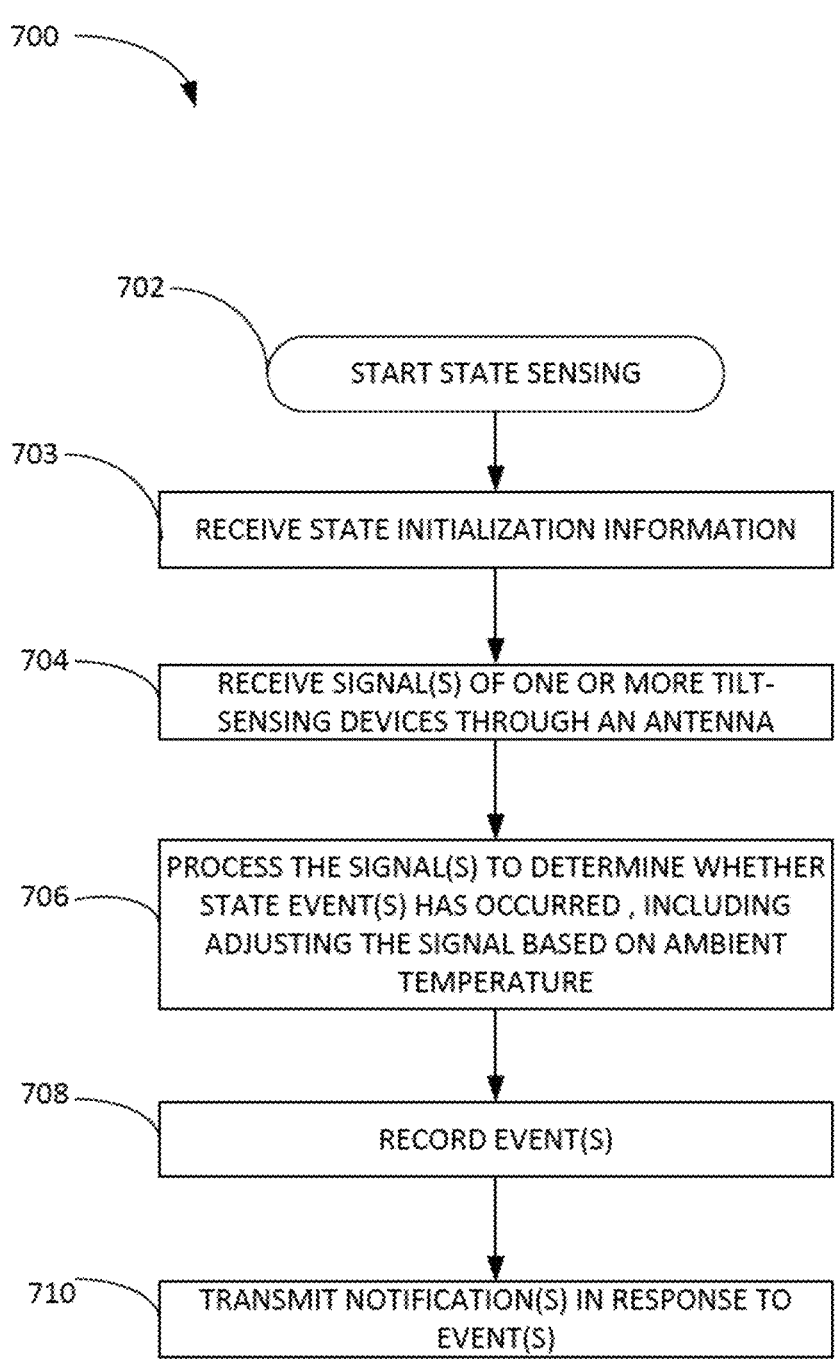
FIG. 7 illustrates an example method of determining a tilt-state from signal received from a tilt-sensing device.
Figure 8:
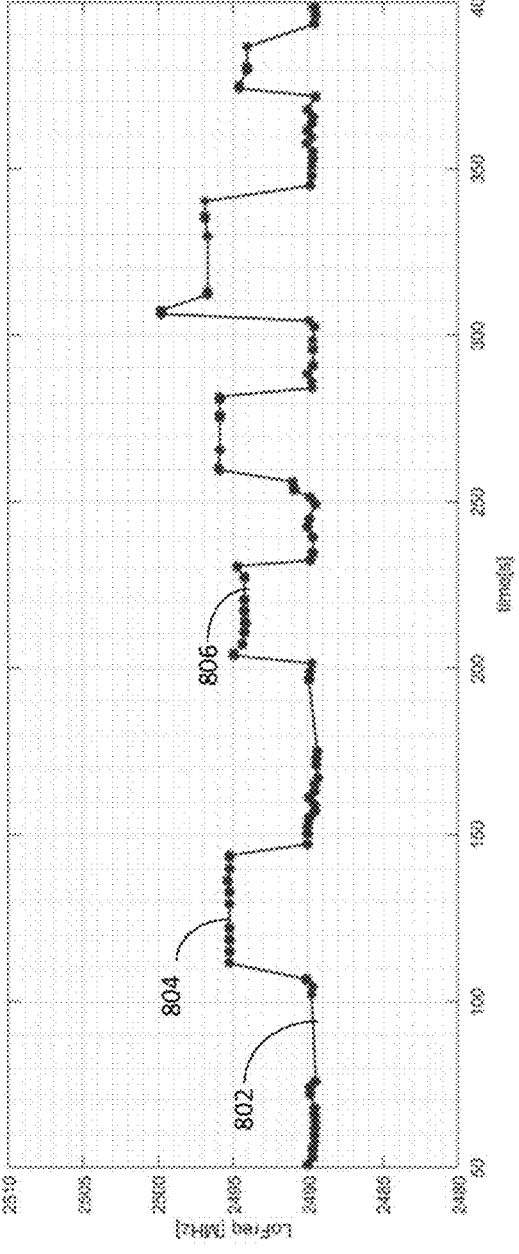
FIG. 8 illustrates an example signal received from a tilt-sensing device conveying LO frequency information.

FIG. 7 illustrates an example method of determining a tilt-state from signal received from a tilt-sensing device. FIG. 8 illustrates an example signal received from a tilt-sensing device. FIG. 7 and FIG. 8 will be discussed in parallel at least because the example signal illustrated in FIG. 8 may be analyzed using the method illustrated in FIG. 7.

The method may begin at block 702. An external computing device (e.g., reader 102 of FIGS. 1A-1I, gateway 204 of FIGS. 2-3, etc.) may be in electrical communication with an antenna. Electrical communication with an antenna may include a direct connection processor input to the antenna. Additionally, or alternatively, electrical communication may include connection through electronic circuitry including, but not limited to, through an antenna tuner or through transformer (e.g., a balun transformer for impendence matching). The antenna may be configured to receive signal(s) from one or more tilt-sensing devices.

External computing device(s) may include, but are not limited to an RF energy reader (e.g., reader 102 of FIGS. 1A-1I) including a transceiver (e.g., transceiver 500 of FIG. 5), one or more processers to determine tilt-state. In some embodiments, the RF energy reader may be in a gateway (e.g., gateway 204 of FIGS. 2-3). In some embodiments, the RF energy reader may be in same room as tilt-sensing device. Additionally, or alternatively, the RF energy reader may be within threshold distance (e.g., 10 feet) of one or more tilt-sensing device(s). In some embodiments, the RF energy reader may be configured to transmit and receive BLE signals. In some embodiments, the RF energy reader may include 900 MHz radio transmitter. Additionally, or alternatively, the RF energy reader may include 2400 MHz radio transmitter.

In some embodiments, the tilt-sensing devices may include a passive RF energy component. Additionally, or alternatively, the tilt-sensing devices may include an active RF energy component. In some embodiments, the RF energy component may be a BLE component. In some embodiments, the tilt-sensing devices may act as a transponder. For example, in response to a signal from the external computing device, each tilt-sensing device may automatically transmit a signal containing their unique identifier and tilt-state information. In a non-limiting embodiment, a passive RF energy component of a tilt-sensing device may harvest energy from the signal received from the external computing device (e.g., by passive backscatter modulation). In some embodiments, energy may be harvested from received signals at frequencies including, but not limited to 900 MHz or 2400 MHz. The frequency of the signal transmitted by the external computing device may include, but is not limited to, 2400 MHz. In some embodiments, tilt-sensing devices may include more than one antenna and associated circuitry in order to receive and transmit signals at different frequency ranges. Tilt-sensing device(s) may be coupled to moveable surfaces. In some embodiments, tilt-sensing devices may be coupled to tilt-opening door(s). In a non-limiting embodiment, the tilt-sensing devices may be coupled to garage door(s). Placement on tilt-opening doors may be as described above with respect to FIGS. 1A-H and FIGS. 6A-E.

At block 703, the external computing device may receive state initialization information relating to the state of a moveable surface(s) from one or more tilt-sensing device(s). For example, a tilt-sensing device may be coupled to a moveable surface in an open state. During configuration of the tilt-sensing device, the tilt-sensing device may transmit signals when the moveable surface is at multiple different orientations. For each signal, a user may provide input on a state of the moveable surface which corresponds to a signal transmitted by the tilt-sensing device. For example, the user may specify that a signal transmitted when the moveable surface is substantially horizontal may correspond to an open state of the moveable surface. This user input may form state initialization information for the tilt-sensing device. In some embodiments, the external computing device may request state initialization information on receipt of a first signal from a tilt-sensing device. Additionally, or alternatively, state initialization information may be transmitted to or entered into the external computing device. The external computing may save this information for each tilt-sensing device.

At block 704, the external computing device may receive signal(s) from one or more tilt-sensing devices through an antenna. Additionally, or alternatively, the external computing device receive signal(s) from one or more tilt-sensing device(s) through one or more antennas. In some embodiments, each antenna may receive signals within a different frequency range.

In some embodiments, the external computing device may receive signal(s) from multiple tilt-sensing devices, as discussed above with respect to FIGS. 6A-E. Each tilt-sensing device may have a unique identifier. The unique identifier may be transmitted as part of signal in addition to tilt-state information. The unique identifier may be transmitted during an initial handshake to initiate communication with antenna. In some embodiments, the unique identifier may be transmitted as part of an advertising packet (e.g., BLE advertising packet). In some embodiments, the antenna of a tilt-sensing device may be detuned by a moveable component in order to transmit tilt-state information. Illustratively, detuning may cause a component frequency (e.g., LO frequency to shift). Detuning may also correspond with a shift in the power of the signal transmitted by the antenna of the tilt-sensing device. In further embodiments, the external computing device may be able to receive the unique identifier of a tilt-sensing device during initial handshake, regardless in shift of frequency in signal received from tilt-sensing device.

As discussed above, a shift in component frequency conveyed in a signal and/or shift in antenna power conveyed in a signal received from a tilt-sensing device may indicate changes in tilt-state. The shift in frequency may be in a particular frequency range. For example, the shift may occur in the frequency range of a local oscillator (LO) of the tilt-sensing device. In some embodiments, the local oscillator (LO) frequency may match the frequency of the signal received from the external computing device. In some embodiments, the shift in component frequency conveyed by the signal received from a tilt-sensing device may be decrease of 5 MHz in the local oscillator (LO) frequency as compared to an expected frequency. Of course, the shift in component frequency in the signal received from the tilt-sensing device may be an increase in frequency. Illustratively; the LO frequency may increase by 5 MHz. This shift may indicate that the tilt-sensing device is in a substantially horizontal orientation such that a moveable component of the tilt-sensing device is proximate to an antenna of the tilt-sensing device, such that the antenna is detuned.

FIG. 8 illustrates an example of a signal received from a tilt-sensing device which conveys LO frequency information. In some embodiments, signal components 804 and 806 may be areas of the signal that have not been shifted by a change in orientation of a tilt-sensing device. For example, signal components 804 and 806 may indicate that the tilt-sensing device may be in a substantially vertical orientation such that a moveable component of the tilt-sensing device may not be proximate to the antenna, and component frequency information (e.g., LO frequency) conveyed in antenna signal may not be shifted in frequency. In some embodiments, signal component 802 may indicate an area of the signal that is shifted in frequency from an expected value. In some embodiments, the shift may be a decrease in frequency. However, the shift may also be an increase in frequency. For example, signal component 802 may indicate that the tilt-sensing device may be in a substantially horizontal orientation such that a moveable component of the tilt-sensing device may be proximate to the antenna, and the component frequency information (e.g., LO frequency) conveyed in antenna signal may be shifted.

In some embodiments, different shifts in component frequency (e.g., LO frequency) may indicate different positions. For example, a shift of less than 5 MHz may indicate that a moveable surface is in an angled orientation. In some embodiments, the external computing device may make use of different thresholds in order to capture frequency shifts of different degrees. As will be discussed in more detail below at blocks 708 and 710, the external computing device may then use this information to determine the tilt-state of a tilt-sensing device and/or a movable surface coupled to the tilt-sensing device.

At block 708, the external computing device may record state event(s), such as frequency shifts, which have occurred. Recorded information related to the state event(s) may include time of occurrence of the event. In some embodiments, the external computing device may determine from recorded state event(s) whether tilt-sensing device(s) have changed orientation. Additionally, or alternatively, the external computing device may determine from recorded state event(s) whether movable surface coupled to one or more tilt-sensing device(s) has changed orientation. For example, the external computing device may determine, based on the state event(s) whether a tilt-opening door is open or closed.

In some embodiments, the external computing device may make a determination on the tilt-state of a moveable surface from recorded state event(s) from more than one tilt-sensing device. For example, with reference to the illustrative example of FIG. 6C, the top of a moveable surface may change orientation at different time than bottom of door. For example, a tilt-sensing device at the top of a moveable surface may be substantially horizontal at a time when a tilt-sensing device at the bottom of the moveable surface is substantially vertical. The external computing device may use this information to determine that the moveable surface is in a partially-open state.

In a non-limiting embodiment, the moveable surface may be a garage door with multiple portions including a top portion and a bottom portion. Both the top and bottom portion may be coupled to a tilt-sensing device. At a first time, a first tilt-sensing device on the top portion may be substantially horizontal when a second tilt-sensing device on the bottom portion is substantially vertical. The external computing device may transmit a first signal the tilt-sensing device(s). The tilt-sensing device(s) may each transmit a response signal which may be received by the external computing device. The external computing device may process the signals received from the tilt-sensing devices. For example, the external computing device may process the received signals simultaneously. Additionally, or alternatively, the external computing device may process the received signals at different times. The signal from the first tilt-sensing device may indicate that the first tilt-sensing device is substantially horizontal. Illustratively, component frequency information (e.g., LO frequency) conveyed in the signals from the first tilt-sensing device may be shifted in frequency in a manner that indicates that the tilt-sensing device is substantially horizontal. In a non-limiting embodiment, the first tilt-sensing device may be shifted in LO frequency by 5 MHz when substantially horizontal. The signal from the second tilt-sensing device may indicate that the second tilt-sensing device is substantially vertical. For example, the component frequency information (e.g., LO Frequency) conveyed in the signal from the second tilt-sensing device may not be shifted. In a non-limiting embodiment, the LO frequency of the second tilt-sensing device may be as expected. The external computing device may use this information to determine that the garage door is partly open. In a non-limiting embodiment, the external computing device may use this information to determine that the garage door is 50% open.

At block 710, external computing device may transmit notifications(s) in response to state events. In some embodiments, the external computing device may not transmit notifications for state events. Additionally, or alternatively, the external computing device may transmit notifications for some state events and not for others. For example, a delivery service provider (e.g., delivery service provider 210 of FIG. 2) may request notifications for certain state event(s) but not for others. State events may include, but are not limited to, a change in state of one tilt-sensing device, a change in state of both tilt-sensing devices, or a pattern of change in state of tilt-sensing device(s) within a period of time. As an example of a state event of a pattern of change in state of a tilt-sensing device, a moveable surface may correspond to an expected period of time to change in orientation. This expected period of time may be provided to the external computing device during configuration of the sensor. For that expected period of time, the external computing device may track changes in tilt-state of a tilt-sensing device coupled to the moveable surface. The external computing device may then and transmit a notification (e.g., to delivery service provider 210 of FIG. 2) indicating whether or not the moveable surface has changed orientation as expected. In a non-limiting embodiment, the moveable surface may be a garage door and the expected period of time may be five to ten seconds. This time may be adjusted per unique garage door during configuration of a sensor coupled to the garage door.

In some embodiments, blocks 704-710 may repeat at intervals. For example, the external computing device may repeat blocks 704-710 at intervals set to the expected time period for the moveable surface. Additionally, or alternatively, the external computing device may repeat blocks

704-710 at intervals set to a greater or lesser amount of time the expected time period for the moveable surface.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for determining a state of a first tilt-opening door, the system comprising:

a first passive tilt-sensing device coupled to the first tilt-opening door; wherein the first passive tilt-sensing device comprises:

a passive RF energy component configured to transmit information including a first unique identifier;

a moveable component configured to cause the passive RF energy component to transmit tilt-state information at least by causing a shift in signals transmitted by the passive RF energy component when the first passive tilt-sensing device is in a substantially horizontal position, wherein, when the first passive tilt-sensing device is in a substantially horizontal orientation, the moveable component causes distribution of a material in a first location proximate to the passive RF energy component in a manner that results in additional capacitance to be realized on an antenna of the passive RF energy component, wherein the additional capacitance causes a shifting in LO frequency conveyed by signals transmitted by the first passive tilt-sensing device, and wherein, when the first passive tilt-sensing device is in a substantially vertical orientation, the moveable component causes distribution of the material in a second location not proximate to the RF energy component, wherein the distribution of the material does not impact LO frequency conveyed by signals transmitted by the first passive tilt-sensing device;

an RF energy reader comprising:

an antenna, a transceiver, and one or more processors configured to:

transmit a first signal to the first passive tilt-sensing device;

receive a second signal from the first passive tilt-sensing device;

process the second signal to determine the first unique identifier and a first tilt-state, wherein the determination of the first tilt-state is based on a comparison between the first signal and the second signal indicating that the LO frequency conveyed by the second signal has been shifted by the additional capacitance.

2. The system of claim 1, wherein the first tilt-state comprises at least one of: substantially vertical, angled, or substantially horizontal.

3. The system of claim 1, wherein the one or more processors are further configured to:

determine that the first tilt-state is substantially vertical;

transmit a third signal to the first passive tilt-sensing device;

receive a fourth signal from the first passive tilt-sensing device;

process the fourth signal to determine the first unique identifier and a second tilt-state, wherein the second tilt-state is substantially horizontal; and generate an alert indicating a state change of the first passive tilt-sensing device.

4. The system of claim 1, further comprising a second passive tilt-sensing device coupled to the tilt-opening door; wherein the second passive tilt-sensing device comprises:

a passive RF energy component configured to transmit information including a second unique identifier;

a moveable component configured to cause the passive RF energy component to transmit tilt-state information at least by causing a shift in LO frequency conveyed by signals transmitted by the passive RF energy component when the passive RF energy component is in a substantially horizontal position, wherein, when the second passive tilt-sensing device is in a substantially horizontal orientation, the moveable component causes distribution of a material in a first location proximate to the passive RF energy component in a manner that results in additional capacitance to be realized on an antenna of the passive RF energy component, wherein the additional capacitance causes a shifting in LO frequency conveyed by signals transmitted by the second passive tilt-sensing device, and wherein, when the second passive tilt-sensing device is in a substantially vertical orientation, the moveable component causes distribution of the material in a second location not proximate to the RF energy component, wherein the material does not impact LO frequency conveyed by signals transmitted by the second passive tilt-sensing device.

5. The system of claim 1, wherein the system further comprises a second tilt-opening door and a second passive tilt-sensing device coupled to the second tilt-sensing door, wherein the second passive tilt-sensing device comprises:

a passive RF energy component configured to transmit information including a second unique identifier;

a moveable component configured to cause the passive RF energy component to transmit tilt-state information at least by causing a shift in a component frequency conveyed by signals transmitted by the passive RF energy component when the passive RF energy component is in a substantially horizontal position, wherein, when the second passive tilt-sensing device is in a substantially horizontal orientation, the moveable component causes distribution of a material in a first location proximate to the passive RF energy component in a manner that results in additional capacitance to be realized on an antenna of the passive RF energy component, wherein the additional capacitance causes a shifting in component frequency conveyed in signals transmitted by the second passive tilt-sensing device, and wherein, when the second passive tilt-sensing device is in a substantially vertical orientation, the moveable component causes distribution of the material in a second location not proximate to the RF energy component, wherein the material does not impact component frequency conveyed in signals transmitted by the second passive tilt-sensing device.

6. The system of claim 1, wherein the moveable component of the first passive tilt-sensing device comprises an inclined surface configured to direct the material to the first location.

7. The system of claim 1, wherein the first passive tilt-sensing device further comprises a third portion coupled to the first tilt-opening door, wherein the third portion comprises an inclined surface configured to direct the material of the moveable component to the first location.

8. The system of claim 1, wherein the RF energy component is an RFID component.

9. A tilt-sensing device comprising:

a first portion comprising a transmission component, wherein the transmission component comprises an antenna for transmitting a signal;

a second portion, including a moveable component and defining an area for movement of the moveable component, wherein the moveable component is configured to be in a first position proximate to the transmission component in when the tilt-sensing device is in a first orientation, such that the moveable component causes a change in attributes of signals transmitted by the transmission component relative to attributes of signals when then the moveable component is configured to be in a second position away from the transmission component.

10. The tilt-sensing device of claim 9, wherein, when the moveable component is in the second position, the moveable component does not cause a shift in attributes of signals transmitted by the transmission component.

11. The tilt-sensing device of claim 9, wherein the transmission component comprises a plurality of antenna, wherein each antenna of the plurality of antenna is configured to receive a different frequency range.

12. The tilt-sensing device of claim 9, wherein the second portion has additional structures to direct the moveable component behind the transmission component and wherein the additional structures comprise an inclined surface.

13. The tilt-sensing device of claim 9, wherein the tilt-sensing device further comprises a third portion, wherein the third portion is coupled to the second portion and a moveable surface external to the tilt-sensing device, and wherein the third portion is configured to direct the moveable component behind a sub-portion of the transmission component.

14. The tilt-sensing device of claim 9, wherein the moveable component comprises a dielectric material.

15. The tilt-sensing device of claim 9, wherein moveable component comprises at least one of: water, cardboard, ethanol, glycerine, acetonitrile, or isopropyl alcohol.

16. The tilt-sensing device of claim 9, wherein the moveable component comprises one or more ball bearings and a fluid configured to facilitate movement of the one or more ball bearings.

17. A method for determining a tilt state of a moveable surface, the method comprising:

transmitting, by a first computing device, a first signal including energy required to power a first tilt-sensing device coupled to the moveable surface;

receiving, by the first computing device, a second signal generated by the first tilt-sensing device, wherein the second signal comprises a unique identifier of the first tilt-sensing device and frequency attributes, wherein the frequency attributes depend on a position of a movable component of the first tilt-sensing device with respect to an antenna component of the first tilt-sensing device;

analyzing, by the first computing device, the second signal to determine a tilt-state of the first tilt-sensing device based on the frequency attributes;

outputting, by the first computing device, a notification of the tilt-state to a second computing device.

18. The method of claim 17, further comprising:

receiving, by the first computing device, a third signal generated by a second tilt-sensing device, wherein the second tilt-sensing device is coupled to the first moveable surface in a different location than the first tilt-sensing device, wherein the third signal comprises a unique identifier of the second tilt-sensing device and frequency attributes, and wherein the frequency attributes depend on the position of a moveable component of the first tilt-sensing device with respect to an antenna component of the second tilt-sensing device;

analyzing, by the first computing device, the third signal to determine tilt-state of the second tilt-sensing device based on the frequency attributes included in the third signal, wherein the first computing device differentiates the received signals based on the unique identifiers comprised in the signals and wherein the tilt-state of the second tilt-sensing device differs from the first tilt-sensing device; and outputting, by the first computing device, a notification of the tilt-state of the first tilt-sensing device and the tilt-state of the second tilt-sensing device to a second computing device.

19. The method of claim 17, further comprising:

receiving, by the first computing device, a third signal generated by a second tilt-sensing device, wherein the second tilt-sensing device is coupled to the first moveable surface in a different location than the first tilt-sensing device, wherein the third signal comprises a unique identifier of the second tilt-sensing device and frequency attributes, and wherein the frequency attributes depend on the position of a moveable component of the first tilt-sensing device with respect to an antenna component of the second tilt-sensing device;

analyzing, by the first computing device, the third signal to determine a tilt-state of the second tilt-sensing device based on the frequency attributes included in the third signal, wherein the first computing device differentiates the received signals based on the unique identifiers comprised in the signals and wherein the tilt-state of the second tilt-sensing device is determined to match the first tilt-sensing device; and outputting, by the first computing device, a notification of the tilt-state of the first tilt-sensing device and the tilt-state of the second tilt-sensing device to a second computing device.

20. The method of claim 17, further comprising:

receiving, by the first computing device, a third signal generated by a second tilt-sensing device, wherein the second tilt-sensing device is coupled to a second moveable surface, wherein the third signal comprises a unique identifier of the second tilt-sensing device and frequency attributes, and wherein the frequency attributes depend on the position of a moveable component of the first tilt-sensing device with respect to an antenna component of the second tilt-sensing device;

analyzing, by the first computing device, the third signal to determine tilt-state of the second tilt-sensing device based on the frequency attributes included in the third signal, wherein the first computing device differentiates the received signals based on the unique identifiers comprised in the signals; and outputting, by the first computing device, a notification of the tilt-state to a second computing device.

21. The method of claim 18, further comprising:

receiving, by the first computing device, a fourth signal generated by a third tilt-sensing device coupled to a second moveable surface, wherein the fourth signal comprises a unique identifier of the third tilt-sensing device and frequency attributes, wherein frequency attributes depend on the position of a moveable component of the third tilt-sensing device with respect to an antenna component of the third tilt-sensing device;

analyzing, by the first computing device, the fourth signal to determine tilt-state of the third tilt-sensing device based on the frequency attributes included in the fourth signal, wherein the first computing device differentiates the received signals based on the unique identifiers comprised in the signals; and outputting, by the first computing device, a notification of the tilt-state to a second computing device.

22. The method of claim 18, further comprising:

receiving, by the first computing device, a fourth signal generated by a third tilt-sensing device coupled to a third moveable surface, wherein the fourth signal comprises a unique identifier of the third tilt-sensing device and frequency attributes, wherein the frequency attributes depend on the position of a moveable component of the third tilt-sensing device with respect to an antenna component of the third tilt-sensing device;

analyzing, by the first computing device, the third signal to determine tilt-state of the third tilt-sensing device based on the frequency attributes included in the fourth signal, wherein the first computing device differentiates the received signals based on the unique identifiers comprised in the signals; and outputting, by the first computing device, a notification of the tilt-state to a second computing device.

23. An electronic device comprising:

a passive tag component comprising:

an antenna;

a wireless transceiver;

a processing component;

one or more integrated circuit components comprising one or more computer readable media storing electronically executable instructions which, when executed using the integrated circuit components, cause the passive electronic device to perform operations comprising:

based on receiving a first signal using the antenna, determining, based on a frequency of a local oscillator component, a first value, determining, using a temperature sensor, a second value, wirelessly transmitting, using the antenna and the wireless transceiver, a second signal representing first data indicating the first value and the second value;

a housing containing detuning material;

wherein, when the passive electronic device is oriented in a first orientation, one or more elements of the detuning material are biased by gravity to move closer to the passive tag component;

wherein, when the passive electronic device is oriented in a second orientation, one or more elements of the detuning material are biased by gravity to move further from the passive tag component;

wherein a frequency of the local oscillator is impacted by the proximity of the detuning material such that transitioning of the passive electronic device between the first orientation and the second orientation impacts the first value.

24. The electronic device of claim 23, wherein the material comprises a plurality of metal objects.

25. The electronic device of claim 23, wherein the material comprises metal.

26. The electronic device of claim 23, wherein the first data indicates a unique identifier corresponding to the electronic device.

* * * * *